US011979697B2

(12) United States Patent
Shao et al.

(10) Patent No.: US 11,979,697 B2
(45) Date of Patent: May 7, 2024

(54) METHODS AND INTERNET OF THINGS SYSTEMS FOR OBTAINING NATURAL GAS ENERGY METERING COMPONENT

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Yong Li, Chengdu (CN); Bin Liu, Chengdu (CN); Yaqiang Quan, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 168 days.

(21) Appl. No.: 17/664,656

(22) Filed: May 24, 2022

(65) Prior Publication Data

US 2022/0286761 A1    Sep. 8, 2022

(30) Foreign Application Priority Data

Jul. 26, 2021  (CN) .......................... 202110844482.9
Apr. 14, 2022  (CN) .......................... 202210387064.6

(51) Int. Cl.
*H04Q 9/02*    (2006.01)
*G06N 20/00*   (2019.01)

(52) U.S. Cl.
CPC ............. *H04Q 9/02* (2013.01); *G06N 20/00* (2019.01); *H04Q 2209/60* (2013.01); *H04Q 2209/84* (2013.01)

(58) Field of Classification Search
CPC .. H04Q 9/02; H04Q 2209/60; H04Q 2209/84; G06N 20/00
See application file for complete search history.

(56) References Cited

U.S. PATENT DOCUMENTS 11,681,283 B1 *  6/2023  Shao ............... G05B 19/41875
                                                     702/187
2016/0281574 A1  9/2016  Abel et al.
(Continued)

FOREIGN PATENT DOCUMENTS

CN    101383023 A    3/2009
CN    102590688 A    7/2012
(Continued)

OTHER PUBLICATIONS

First Office Action in Chinese Application No. 202110844482.9 dated Apr. 27, 2023, 25 pages.
(Continued)

*Primary Examiner* — Jamel E Williams
(74) *Attorney, Agent, or Firm* — METIS IP LLC

(57) ABSTRACT

The embodiments of the present disclosure provide a method for obtaining a natural gas energy metering component, including obtaining a temperature and pressure of a natural gas sample to be detected at a first site based on an object platform; obtaining sample data of a natural gas sample at a second site based on the object platform, the sample data including a natural gas component and a temperature and pressure of the natural gas component; obtaining sample data of a natural gas sample at the first site based on the object platform; determining a natural gas component of the natural gas sample to be detected at the first site based on sample data at the first site and the second site aggregated by a sensor network platform and the temperature and pressure of the natural gas sample to be detected at the first site.

7 Claims, 13 Drawing Sheets

(56) References Cited

U.S. PATENT DOCUMENTS

| | | | |
|---|---|---|---|
| 2018/0024968 | A1 | 1/2018 | Clinchant et al. |
| 2018/0302291 | A1 | 10/2018 | Srinivasan et al. |
| 2019/0286620 | A1 | 9/2019 | Al-Haimi et al. |
| 2021/0164682 | A1 | 6/2021 | Mujumdar et al. |
| 2021/0334440 | A1 | 10/2021 | Yamashina et al. |

FOREIGN PATENT DOCUMENTS

| | | | | |
|---|---|---|---|---|
| CN | 103557899 | A | 2/2014 | |
| CN | 103776800 | A | 5/2014 | |
| CN | 104197984 | A | 12/2014 | |
| CN | 105807027 | A | 7/2016 | |
| CN | 107358059 | A | 11/2017 | |
| CN | 107977513 | A | 5/2018 | |
| CN | 108038580 | A | 5/2018 | |
| CN | 109993364 | A | 7/2018 | |
| CN | 108932863 | A | 12/2018 | |
| CN | 109781200 | A | 5/2019 | |
| CN | 110068375 | A | 7/2019 | |
| CN | 110162799 | A | 8/2019 | |
| CN | 110400423 | A | 11/2019 | |
| CN | 110672172 | A | 1/2020 | |
| CN | 110674604 | A | 1/2020 | |
| CN | 111337071 | A | 6/2020 | |
| CN | 111486930 | A | 8/2020 | |
| CN | 111695591 | A | 9/2020 | |
| CN | 111931721 | A | 11/2020 | |
| CN | 211926930 | U | 11/2020 | |
| CN | 112561726 | 4 | 3/2021 | |
| CN | 112655004 | A | 4/2021 | |
| CN | 212903317 | U | 4/2021 | |
| CN | 112825157 | A | 5/2021 | |
| CN | 112986492 | A | 6/2021 | |
| CN | 113109506 | A | 7/2021 | |
| CN | 113129164 | A | 7/2021 | |
| CN | 113176304 | A | 7/2021 | |
| CN | 113221304 | A | 8/2021 | |
| CN | 113570475 | A | 10/2021 | |
| CN | 113570475 | A * | 10/2021 | ............ G06N 20/00 |
| CN | 113946785 | A | 1/2022 | |
| CN | 114117695 | A | 3/2022 | |
| CN | 114300068 | A | 4/2022 | |
| WO | 2021099338 | A1 | 5/2021 | |

OTHER PUBLICATIONS

First Office Action in Chinese Application No. 202210387064.6 dated Mar. 16, 2023, 29 pages.

Energy Determination for Natural Gas, China National Standardization Administration Committee, China Standard Press, 2008, 88 pages.

Chen, Renjie et al., Joint Entity and Relation Extraction Fusing Entity Type Information, Computer Engineering, 48(3): 46-53, 2022.

Li, Zhong-Ming, Prediction of Dissolved Gas Concentration in Transformer Oil Based on the Combined Forecasting Model, Chemical Automation and Instrumentation, 45(8): 607-610, 639, 2018.

Shao, Zehua et al., Remote Control System and Control Method of Water Meter Based on Internet of Things, Internet of Things Technologies, 2021, 18 pages.

Khaled Shaban et al., A Cascade of Artificial Neural Networks to Predict Transformers Oil Parameters, IEEE Transactions on Dielectrics and Electrical Insulation, 16(2): 516-523, 2009.

L.I. Morales et al., Optimization of an Absorption Heat Transformer with Two-Duplex Components Using Inverse Neural Network and Solved by Genetic Algorithm, Applied Thermal Engineering, 2015, 35 pages.

Xu, Chunye et al., A Feasibility Study on the Construction of Metering and Pricing System for Pipelined Natural Gas, Oil & Gas and New Energy, 33(1): 46-49, 2021.

Chen, Gengliang, A Discussion on the Indirect Measurement of Natural Gas Calorific Value, Oil & Gas Gathering, Transportation and Treatment, 39(2): 41-47, 2021.

Xu, Xiaoxuan et al., An Energy Measurement Method For Multi-Source Natural Gas Distribution Pipeline Networks, Natural Gas Industry, 38(1): 116-122, 2018.

Cai, Li et al., Further Discussion on Uncertainty Evaluation of Indirect Measurement of Natural Gas Calorific Value: Uncertainty Evaluation of Compression Factor Under Reference Condition, Chemical Engineering of Oil & Gas, 45(1): 89-91, 2016.

Li, Ke et al, Exploration of Energy Calculation Methods for Natural Gas, Technology Supervision in Petroleum Industry, 35(8): 26-28, 2019.

Wang, Chun-Sheng et al., Calculation of Natural Gas Compressibility Factor and Its Influence Factors, Contemporary Chemical Industry, 44(6): 1408-1411, 2015.

Solomon Brown et al., A Multi-Source Flow Model For Ccs Pipeline Transportation Networks, International Journal of Greenhouse Gas Control, 43(12): 108-114, 2015.

Meryem Terhan et al., Energy and Exergy Analyses of Natural Gas-Fired Boilers in a District Heating System, Applied Thermal Engineering, 2017, 25 pages.

S. Parvizi et al., Natural Gas Compositions Variation Effect on Capillary Tube Thermal Mass Flow Meter Performance, Flow Measurement and Instrumentation, 2016, 20 pages.

Luo, Junping et al., Review on Reliability Evaluation of Urban Integrated Energy System based on Multi-Source Data, 2020 15th IEEE Conference on Industrial Electronics and Applications (ICIEA), 2020, 7 pages.

G. Ficco et al., Uncertainty Analysis of Energy Measurements in Natural Gas Transmission Networks, Flow Measurement and Instrumentation, 2015, 11 pages.

Jacek Jaworski et al., Study of the Effects of Changes in Gas Composition as Well as Ambient and Gas Temperature on Errors of Indications of Thermal Gas Meters, Energies, 13(20): 1-23, 2020.

Notification to Grant Patent Right for Invention in Chinese Application No. 202210387064.6 dated Aug. 23, 2023, 7 pages.

White Paper on Urban Brain Development, Smart City Standard Working Group of National Beacon Commission, 2022, 59 pages.

* cited by examiner

300

```
┌─────────────────────────────────────────┐
│ Obtaining the temperature and pressure  │
│ of the natural gas sample to be detected│ ⟋310
│ at the first site based on the object   │
│                platform                 │
└─────────────────────────────────────────┘
                    ↓
┌─────────────────────────────────────────┐
│ Obtaining sample data of the natural gas│
│ sample at the second site based on the  │
│ object platform, wherein the sample     │ ⟋320
│ data includes the natural gas component │
│ and the temperature and pressure of the │
│         natural gas component           │
└─────────────────────────────────────────┘
                    ↓
┌─────────────────────────────────────────┐
│ Obtaining sample data of the natural gas│
│ sample at the first site based on the   │
│ object platform, wherein the sample     │ ⟋330
│ data includes the natural gas component │
│ and the temperature and pressure of the │
│         natural gas component           │
└─────────────────────────────────────────┘
                    ↓
┌─────────────────────────────────────────┐
│ Determining the natural gas component of│
│ the natural gas sample to be detected at│
│ the first site based on the sample data │
│ at the first site and the second site   │ ⟋340
│ aggregated by the sensor network        │
│ platform and the temperature and        │
│ pressure of the natural gas sample to be│
│        detected at the first site       │
└─────────────────────────────────────────┘
                    ↓
┌─────────────────────────────────────────┐
│ Determining the calorific value of the  │
│ natural gas sample to be detected based │ ⟋350
│ on the natural gas component of the     │
│    natural gas sample to be detected    │
└─────────────────────────────────────────┘
                    ↓
┌─────────────────────────────────────────┐
│ Performing the energy metering on the   │
│ downstream gas meter based on the       │
│ calorific value of the natural gas      │ ⟋360
│ sample to be detected, and sending the  │
│ energy metering result to the user      │
│ platform through the service platform   │
└─────────────────────────────────────────┘
```

FIG. 3

Establishing a service platform A, a management platform A and a sensor network platform A on the cloud platform inside the IoT system; establishing a user platform A and an object platform A on the two platforms interacting with the cloud platform inside the IoT system, respectively ～910

The user platform A, the service platform A, the management platform A, the sensor network platform A, and the object platform A interact in sequence, and the sensor network platform A perceives and receives data of the object platform A, and sends it to the management platform A; the management platform A performs arithmetic processing on data of the object platform A and sends the data to the user platform A through the service platform A ～920

FIG. 9

Establishing a user platform B and an object platform B on the management platform A, and establishing a service platform B, a management platform B, and a sensor network platform B on the cloud platform outside the IoT system; the user platform B, the service platform B, the management platform B, the sensor network platform B and the object platform B interact in sequence — 1010

FIG. 10

METHODS AND INTERNET OF THINGS SYSTEMS FOR OBTAINING NATURAL GAS ENERGY METERING COMPONENT

CROSS-REFERENCE TO RELATED APPLICATIONS

This application claims the priority of Chinese Patent Application No. CN202110844482.9, filed on Jul. 26, 2021 and the priority of Chinese Patent Application No. 202210387064.6, filed on Apr. 14, 2022, the entire contents of which are incorporated herein by reference.

TECHNICAL FIELD

The present disclosure relates to the field of natural gas technology, and in particular, to methods and Internet of Things systems for obtaining natural gas energy metering component.

BACKGROUND

Natural gas is mainly transported through a long-distance pipeline network, and due to the complex pipeline route and natural gas source, the components from different gas sources varies. When regulating the pressures of natural gas transmission and distribution through different sites, the pressures and temperatures may change, and the volume components of different gas in the natural gas may also change, resulting in inaccurate natural gas component data at a lower-level site. However, direct detection of the natural gas component at the lower-level site may further increase the metering cost.

Therefore, it is desirable to provide a method for obtaining the natural gas energy metering component, wherein the natural gas component of the natural gas sample to be detected may be determined through the analysis of sample data and temperature and pressure at the site, making the determination of the natural gas component more accurate.

SUMMARY

One or more embodiments of the present disclosure provide a method for obtaining the natural gas energy metering component. The method for obtaining the natural gas energy metering component comprises: obtaining a temperature and pressure of a natural gas sample to be detected at a first site based on an object platform; obtaining sample data of a natural gas sample at a second site based on the object platform, the sample data including a natural gas component and a temperature and pressure of the natural gas component; obtaining sample data of a natural gas sample at the first site based on the object platform; sample data at the second site and sample data at the first site are determined in different ways; determining a natural gas component of the natural gas sample to be detected at the first site based on sample data at the first site and the second site aggregated by a sensor network platform and the temperature and pressure of the natural gas sample to be detected at the first site.

One or more embodiments of the present disclosure provide a system for obtaining the natural gas component. The system for obtaining the natural gas component including an object platform, a sensor network platform, a management platform, the management platform is configured to: obtain a temperature and pressure of a natural gas sample to be detected at a first site based on an object platform; obtain sample data of a natural gas sample at a second site based on the object platform, the sample data including a natural gas component and the temperature and pressure of the natural gas component; obtain sample data of the natural gas sample at the first site based on the object platform; sample data at the second site and sample data at the first site are determined in different ways; determine the natural gas component of the natural gas sample to be detected at the first site based on sample data at the first site and the second site aggregated by a sensor network platform and the temperature and pressure of the natural gas sample to be detected at the first site.

One or more embodiments of the present disclosure provide a computer readable storage medium, the storage medium stores computer instructions, and after the computer reads the computer instructions in the storage medium, the computer executes the method for obtaining the natural gas energy metering component.

BRIEF DESCRIPTION OF THE DRAWINGS

The present disclosure will be further described in the way of exemplary embodiments, which will be described in detail with the drawings. These embodiments are not limited, in these embodiments, the same numbers denote the same structures, wherein:

FIG. 3 is an exemplary flowchart illustrating the method for obtaining the natural gas energy metering component according to some embodiments of the present disclosure;

FIG. 9 is a schematic diagram illustrating steps of establishing a platform on a cloud platform inside the Internet of Things system in a method for sharing energy metering data of an intelligent pipe network across networks according to an embodiment of the present disclosure;

FIG. 10 is a schematic diagram illustrating steps of establishing a platform on a cloud platform outside the Internet of Things system in a method for sharing energy metering data of an intelligent pipe network across networks according to an embodiment of the present disclosure;

DETAILED DESCRIPTION

Figure 1:
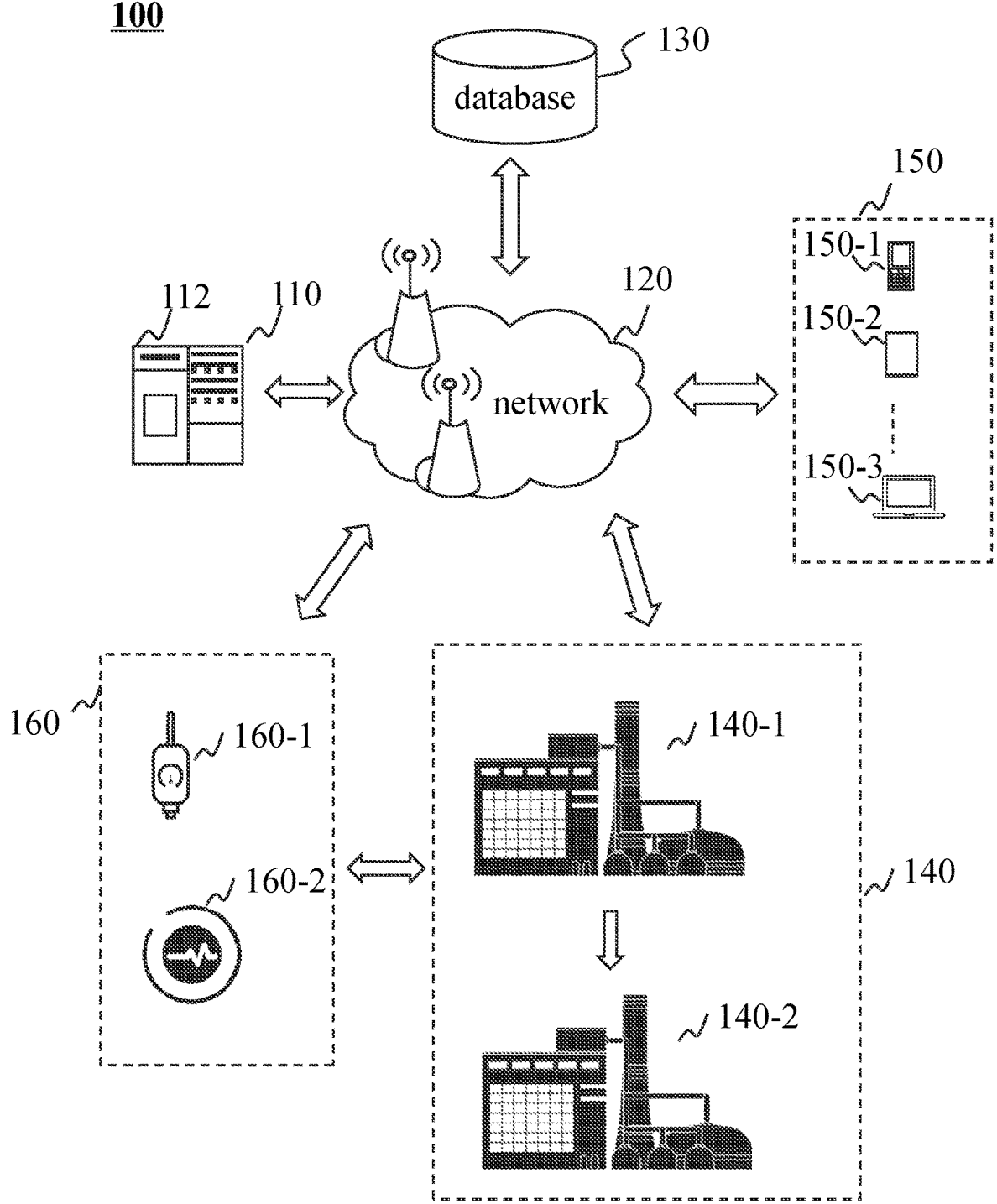
FIG. 1 is an application scenario illustrating the Internet of Things system for obtaining the natural gas energy metering component according to some embodiments of the present disclosure.

To illustrate the technical solutions of the embodiments of the present disclosure more clearly, the following briefly introduces the accompanying drawings used in the description of the embodiments. Obviously, the drawings in the following description are only some examples or embodiments of the present disclosure, and for those ordinary skilled in the art, without creative efforts, may apply the present disclosure to other similar situations according to these drawings. Unless obviously obtained from the context or the context illustrates otherwise, the same numerals in the drawings refers to the same structures or operations.

It is to be understood that "system", "device", "unit" and/or "module" as used herein is a method used to distinguish different components, elements, members, parts or assemblies at different levels. However, words may be replaced by other expressions if they serve the same purpose.

As shown in the present disclosure and claims, unless the context clearly dictates otherwise, the words "a", "an" and/or "the" are not intended to be specific in the singular and may include the plural. Generally speaking, the terms "comprise" and "include" only imply that the clearly identified steps and elements are included, and these steps and elements do not constitute an exclusive list, and the method or apparatus may also include other steps or elements.

Flowcharts are used in the present disclosure to illustrate operations performed by systems according to embodiments of the present disclosure. It should be understood that the preceding or following operations are not necessarily performed in the exact order. Instead, the various steps may be processed in reverse order or simultaneously. At the same time, other actions may be added to these procedures, or a step or steps may be removed from these procedures.

The embodiments of the present disclosure relate to a method and Internet of Things (IoT) system for obtaining the natural gas energy metering component (or natural gas component), which may be applied to various fields that need to obtain the natural gas component, including the field of civil fuel, the field of industrial fuel, the field of process production, the field of chemical raw material production and processing, and the field of compressed natural gas, which is not limited here.

FIG. 1 is an application scenario illustrating the IoT system for obtaining the natural gas energy metering component according to some embodiments of the present disclosure.

An application scenario 100 may include a server 110, a network 120, a database 130, a site 140, a terminal device 150, and a detection device 160. The server 110 may include a processing device 112.

In some embodiments, the natural gas component acquisition application scenario 100 may determine the natural gas component of a natural gas sample to be detected at a first site by implementing the methods and/or processes disclosed in the present disclosure. For example, in a typical application scenario that the pressure and temperature may change when the natural gas is transported from the second site to the first site, the determination of the natural gas component may be more convenient and accurate by performing the following operations including: obtaining the temperature and pressure of the natural gas sample to be detected at a first site 140-2 through an object platform; obtaining sample data of the natural gas sample at a second site 140-1 through the object platform; obtaining sample data of the natural gas sample at the first site 140-2 through the object platform; determining the natural gas component of the natural gas sample to be detected at the first site 140-2, based on sample data at the first site 140-2 and the second site 140-1 aggregated by a sensor network platform and the temperature and pressure of the natural gas sample to be detected at the first site 140-2. The natural gas component may be determined more convenient and accurate.

The server 110 and the terminal device 150 may be connected through the network 120, and the database 130 may be connected to the server 110 through the network 120, and may also be directly connected to the server 110 or located inside the server 110.

The server 110 may be used to manage resources and process data and/or information from at least one component of the system or external data sources (e.g., a cloud data center). In some embodiments, the natural gas component of the natural gas sample to be detected at the first site 140-2 may be determined after being processed by the server 110. The server 110 may obtain the data on the database 130 or save the data to the database 130 during processing. In some embodiments, the server 110 may be a single server or server group. In some embodiments, the server 110 may be regional or remote. In some embodiments, the server 110 may be implemented on a cloud platform, or provided in a virtual fashion.

In some embodiments, the server 110 may include the processing device 112. Operations in the present disclosure may be performed by the processing device 112 executing program instructions. The processing device 112 may process data and/or information obtained from other devices or system elements. The processing device may execute program instructions based on such data, information and/or processing results to perform one or more of the functions described in the present disclosure. In some embodiments, the processing device 112 may include one or more sub-processing devices. For example, a single-core processing device or a multi-core processing device. Merely by way of example, the processing device 112 may include a central processing unit (CPU), an application specific integrated circuit (ASIC), or the like, or any combination thereof.

The network 120 may connect various parts of the natural gas component acquisition application scenario 100 and/or connect the system and external resource parts. In some embodiments, sample data at the first site 140-2 and the second site 140-1 may be transported through the network 120, and data such as the temperature and pressure of the natural gas sample to be detected at the first site 140-2 may also be transported through the network 120. The network 120 enables communication between the various parts and other parts outside the system, facilitating the exchange of data and/or information.

In some embodiments, the network 120 may be any one or more of a wired network or a wireless network. For example, the network 120 may include a cable network, a fiber optic network, or the like, or any combination thereof. The network connection between the various parts may be in one of the above-mentioned ways, and may also be in a variety of ways. In some embodiments, the network may be in point-to-point, shared, centralized, etc., various topologies or a combination of multiple topologies. In some embodiments, the network 120 may include one or more network access points.

The database 130 may be configured to store data and/or instructions. In some embodiments, the database 130 may be used to provide sample data of the natural gas sample at the second site 140-1, sample data of the natural gas sample at the first site 140-2, etc., for the natural gas component acquisition application scenario 100. The database 130 may be implemented in a single central server, multiple servers connected by communication links, or multiple personal devices. In some embodiments, the database 130 may be included in the server 110, the terminal device 150, and/or possibly other parts of the system.

The site 140 refers to various natural gas stations in a natural gas pipeline project, and the site 140 mainly accepts natural gas, pressurizes natural gas in a pipeline, transports natural gas, distributes natural gas, stores natural gas, and adjusts peak of gas consumption, or the like. According to the location in the gas pipeline, the site 140 may include a first gas transmission site, a last gas transmission site, an intermediate site, or the like. According to the role in the gas pipeline, the site 140 may include a natural gas gate site, a natural gas filling site, a natural gas storage and distribution site, a natural gas field site, or the like.

In some embodiments, the site 140 may be provided with the detection device 160 for natural gas data, which may be used to detect performance parameters of the natural gas, such as a pressure, a temperature, a flow, a component, or the like. In some embodiments, the server 110 and/or the terminal device 150 may obtain sample data of the natural gas sample at the second site 140-1 and/or the first site 140-2 based on the detection device 160 through the network 120 or the database 130.

The site 140 may include the first site 140-2 and the second site 140-1. The second site 140-1 may be an upper-level natural gas site of the first site 140-2 and is used for transporting the natural gas to its lower-level site. The first site 140-2 may be a lower-level natural gas site of the second site 140-1, and is used to receive the natural gas from the second site 140-1. One site may be both an upper-level natural gas site and a lower-level natural gas site, and one site may correspond to multiple upper-level natural gas sites and multiple lower-level natural gas sites at the same time.

The terminal device 150 refers to one or more terminal devices or software. In some application scenarios, the user using the terminal device 150 may include the staff at the first site 140-2, the staff at the second site 140-1, third-party inspectors, customers, etc., and may also include other related personnel. In some embodiments, the user of the terminal device 150 may be one or more users. In some embodiments, the terminal device 150 may be one or any combination of other devices having input and/or output functions, such as a mobile device 150-1, a tablet computer 150-2, a laptop computer 150-3, or the like. In some embodiments, the processing device 112 may be included in the terminal device 150 and possibly other parts of the system.

The detection device 160 refers to a device for measuring corresponding state data of the natural gas at the site.

The detection device 160 may include a temperature detection device 160-1, a pressure detection device 160-2, a component detection device (not shown in the figure), a volume detection device (not shown in the figure), or the like. The component detection device may include a chromatographic analyzer, or the like. The temperature detection device 160-1 refers to a device for measuring the temperature of the natural gas at the site, for example, which may be implemented based on a temperature sensor. The pressure detection device 160-2 refers to a device for measuring the pressure of the natural gas at the site, for example, which may be implemented based on a pressure sensor.

It should be noted that the natural gas component acquisition application scenario 100 is provided for illustrative purposes only and is not intended to limit the scope of the present disclosure. Those ordinarily skilled in the art may make various modifications or changes based on the description of the present disclosure. For example, the natural gas component acquisition application scenario 100 may also include an information source. However, such changes and modifications do not depart from the scope of the present disclosure.

The IoT system is an information processing system of part or all of platforms, which include a user platform, a service platform, a management platform, a sensor network platform, and an object platform. The user platform is a leader of the IoT operation system, which may be used to obtain user needs, and user needs are the basis and premise of the formation of the IoT operation system, which is needed to be satisfied by the connection between the IoT platforms. The service platform is located between the user platform and the management platform, and is the bridge between the user platform and the management platform, providing the user with input and output services. The management platform may realize the overall planning and coordination of the connection and cooperation between various functional platforms, the management platform gathers the information of the IoT operation system and may provide perception management and control management functions for the IoT operation system. The sensor network platform may realize the connection between the management platform and the object platform, and play the functions of perceiving information sensor communication and controlling information sensor communication. The object platform is a functional platform for generating perception information and executing control information. For the specific details of the IoT system, please refer to FIG. 8-FIG. 13 and related descriptions, which will not be repeated here.

The processing of information in the IoT system may be divided into the processing flow of perception information and the processing flow of control information, and the control information may be information generated based on the perception information. The processing of perception information is that the object platform obtains perception information and transmits it to the management platform through the sensor network platform. Control information is sent by the management platform to the object platform through the sensor network platform, to realize the control of the corresponding object.

Figure 2:
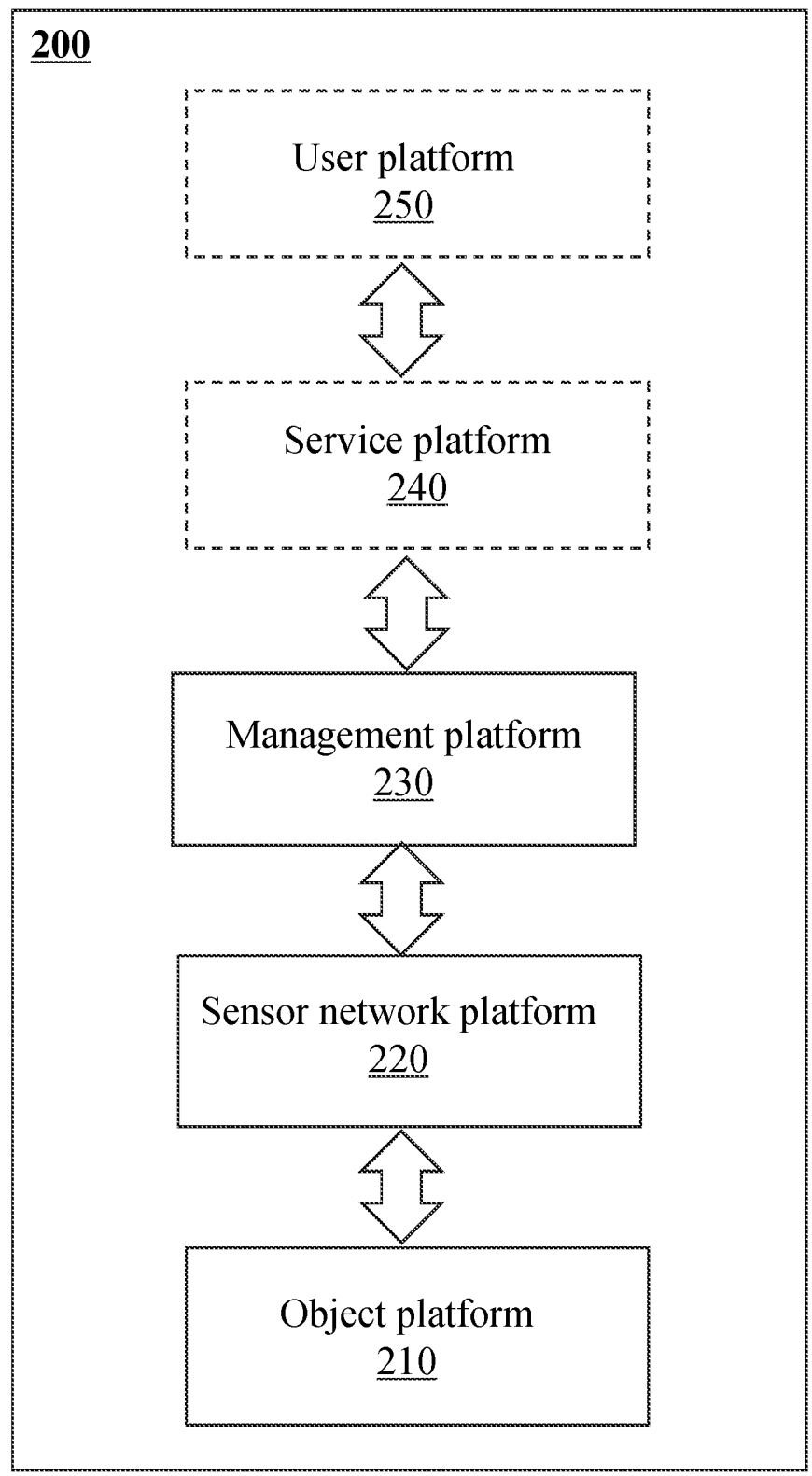
FIG. 2 is a schematic diagram illustrating the Internet of Things system for obtaining the natural gas energy metering component according to some embodiments of the present disclosure.

FIG. 2 is a schematic diagram illustrating a system for obtaining the natural gas energy metering component according to some embodiments of the present disclosure. As shown in FIG. 2, a natural gas component acquisition system 200 may be implemented based on the IoT system, and the natural gas component acquisition system 200 includes an object platform 210, a sensor network platform 220, and a management platform 230. In some embodiments, the natural gas component acquisition system 200 may be part of the processing device 110 or implemented by the processing device 110.

In some embodiments, the natural gas component acquisition system 200 may be applied to natural gas transmission management. When applied to natural gas transmission management, the object platform 210 may be used to collect data related to natural gas transmission, including data at first site and data at second site, for example, the data at first site may be the temperature and pressure of the natural gas sample to be detected at the first site, and sample data of the natural gas sample at the first site, or the like; for another example, data at second site may be sample data of the natural gas sample at the second site, or the like. The object platform 210 may upload the collected data related to natural gas transmission to the sensor network platform 220, and the sensor network platform 220 may summarize and process the collected data, and the management platform 230 may determine the component data of the natural gas sample to be detected based on the data collected by the sensor network platform 220.

In some embodiments, the object platform 210 may obtain information. The acquired information may be used as information input for the entire IoT. The object platform 210 may communicate with the sensor network platform 220, and the object platform 210 is configured to a collect terminal and obtain data. In some embodiments, the data acquired by the object platform 210 may include the temperature and pressure of the natural gas sample to be detected at the first site, the sample data of the natural gas sample at the second site, and the sample data of the natural gas sample at the first site. In some embodiments, the object platform 210 is configured to acquire a plurality of natural gas samples to be detected under multiple temperatures and pressures during the reduction processing of the natural gas sample to be detected.

In some embodiments, the sensor network platform 220 may connect the management platform 230 and the object platform 210 to realize the functions of perceiving information sensor communication and controlling information sensor communication. In some embodiments, the sensor network platform 220 aggregates the sample data at the first site and the second site and the temperature and pressure of the natural gas sample to be detected at the first site.

In some embodiments, the management platform 230 may refer to a platform that manages the natural gas.

In some embodiments, the management platform 230 may be configured to obtain the temperature and pressure of the natural gas sample to be detected at the first site, the sample data of the natural gas sample at the second site, and the sample data of the natural gas sample at the first site through the object platform 210, then determine the natural gas component of the natural gas sample to be detected at the first site. In some embodiments, the sample data of the natural gas sample at the second site includes the natural gas component and the temperature and pressure of the natural gas component. In some embodiments, the sample data at the second site and the sample data at the first site are determined in different ways.

In some embodiments, the management platform 230 may also be configured to determine the natural gas component of the natural gas sample to be detected through a prediction model based on the sample data at the first site, the sample data at the second site, and the temperature and pressure of the natural gas sample to be detected at the first site.

In some embodiments, the management platform 230 may also be configured to determine the natural gas component of the natural gas sample to be detected through the prediction model based on a correction coefficient, the sample data at the first site, the sample data at the second site, and the temperature and pressure of the natural gas sample to be detected at the first site. In some embodiments, the correction coefficient is determined based on the temperature and/or pressure of the natural gas sample to be detected before reduction and the temperature and/or pressure during extraction.

In some embodiments, the management platform 230 may be further configured to determine the calorific value of the natural gas sample to be detected based on the natural gas component of the natural gas sample to be detected; performing an energy metering on a downstream gas meter based on the calorific value of the natural gas sample to be detected, and sending an energy metering result to a user platform 250 through an service platform 240. In some embodiments, the calorific value of the natural gas sample be detected is generated based on component data of the natural gas sample to be detected by a cloud platform outside the IoT system (i.e., a cloud platform is disposed outside the IoT system).

More details of the management platform 230 may be found in FIG. 3-FIG. 7 and the descriptions.

It should be noted that the above descriptions of the system and its parts are only for the convenience of description, and does not limit the present disclosure to the scope of the illustrated embodiments. It may be understood that for those skilled in the art, after understanding the principle of the system, it is possible to arbitrarily combine the various parts, or form a subsystem to connect with other parts without departing from the principle. For example, the sensor network platform and the management platform may be integrated into one part. For another example, each part may share one storage device, and each part may also have its own storage device. Such deformations are all within the protection scope of the present disclosure.

FIG. 3 is an exemplary flowchart illustrating the method for obtaining the natural gas energy metering component according to some embodiments of the present disclosure, and a process 300 is implemented by the management platform.

Step 310, obtaining the temperature and pressure of the natural gas sample to be detected at the first site based on the object platform.

The first site may be a site used for pressure regulation, transmission and distribution of natural gas, and it may be understood that the first site may serve as the lower-level site to receive natural gas transported from the upper-level site, and to regulate, transmit and distribute the natural gas to other sites or regions.

The natural gas sample to be detected may be the natural gas that requires component detection.

Further, the natural gas sample to be detected at the first site may be the natural gas that requires the natural gas component detection at the first site, which may be all or part of the natural gas at the first site.

In some embodiments, the temperature and pressure of the natural gas sample to be detected at the first site may be acquired by the sensor provided at the first site, and recorded in the storage device at the first site in real time. The sensor may be, for example, a temperature sensor, a pressure sensor, etc., or a combination thereof, which is not limited in some embodiments of the present disclosure.

In some embodiments, the temperature value and pressure value of the natural gas to be detected stored at the first site may be acquired through the object platform. For example, the object platform may be used as the corresponding sensor to detect the temperature value and pressure value of the natural gas to be detected. For another example, the object platform separately extracts the temperature value and the pressure value of the natural gas to be detected stored at the first site at a specified point in time at a specified time interval.

Figure 5:
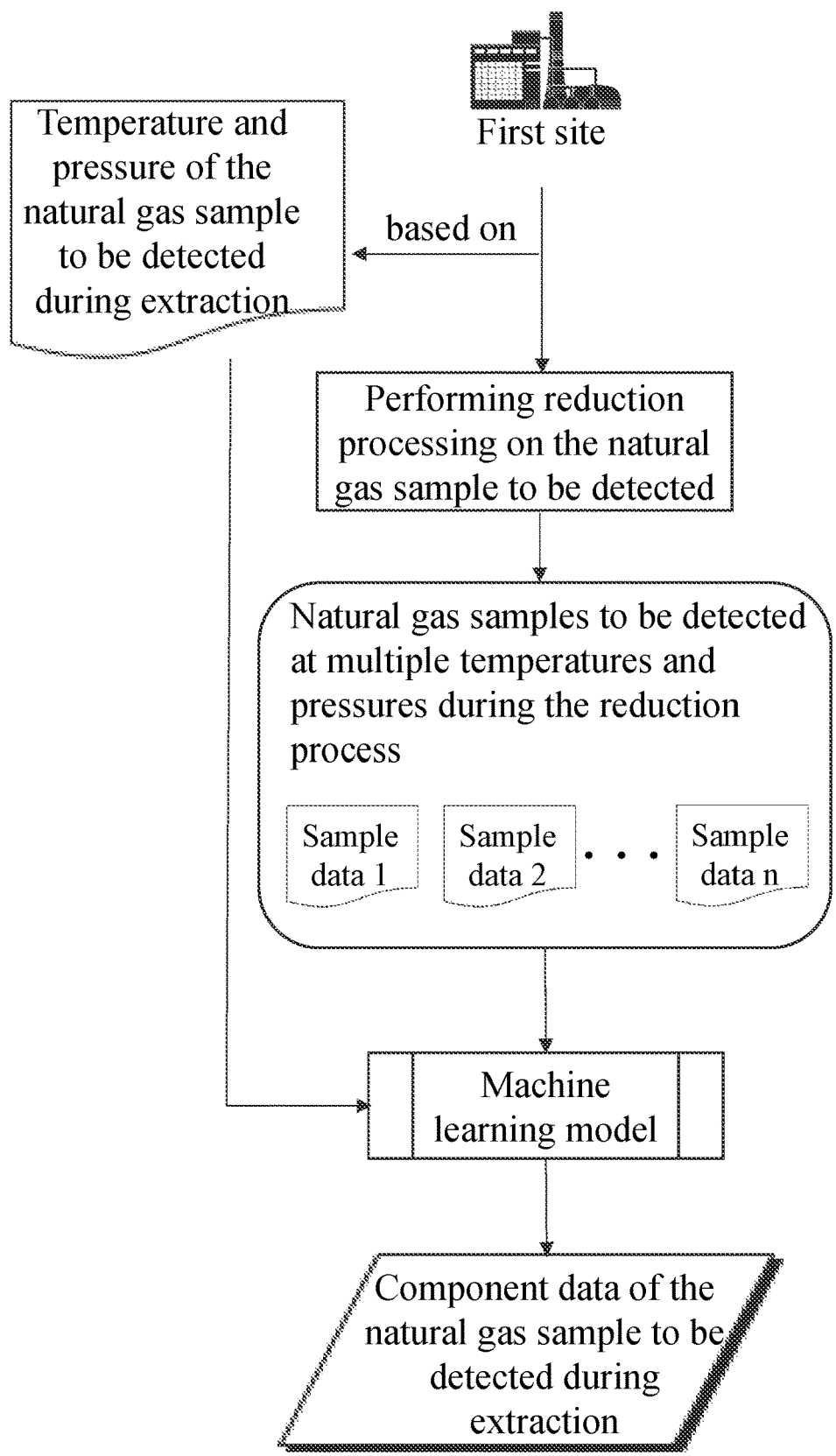
FIG. 5 is a flowchart illustrating the process of obtaining the temperature and pressure of the natural gas sample to be detected at the first site according to some embodiments of the present disclosure.

Referring to FIG. 5 for more instructions on obtaining the temperature and pressure of the natural gas sample to be detected at the first site based on the object platform.

Step 320, obtaining sample data of the natural gas sample at the second site based on the object platform, wherein the sample data includes the natural gas component and the temperature and pressure of the natural gas component.

Sample data refers to data that may be used as a reference sample. Sample data may include relevant parameters of the sample. In some embodiments, sample data of the natural gas sample may include the natural gas component of the natural gas sample and temperature and pressure values corresponding to the component.

In some embodiments, the sample data may be obtained by taking a real-time measurement of the natural gas sample. For example, the temperature and pressure values of the natural gas sample are obtained through the installed temperature and pressure sensors, and component data of the natural gas sample is obtained by analyzing the natural gas sample through a gas chromatography analyzer.

The second site may be an upper-level site that regulates, transmits and distributes natural gas to a lower-level site. It is understandable that the second site (the upper-level site) may perform pressure regulation, transmission and distribution of natural gas to the first site (the lower-level site), so that the first site obtains and stores the natural gas.

Sample data of the natural gas sample at the second site may be the component data and temperature and pressure values of the known natural gas sample at the second site. Sample data of the natural gas sample at the second site may be acquired through the object platform corresponding to the second site. In some embodiments, sample data of the natural gas sample at the second site may be historically acquired natural gas data at the second site. For example, the temperature, pressure and corresponding component data of a part of the natural gas at the second site are obtained in historical production, and the data is used as sample data of the natural gas sample at the second site.

Step 330, obtaining sample data of the natural gas sample at the first site based on the object platform, wherein the sample data includes the natural gas component and the temperature and pressure of the natural gas component.

Sample data of the natural gas sample at the first station may be the component data and temperature and pressure values of the known natural gas sample at the first site. In some embodiments, sample data of the natural gas sample at the first site may be historically acquired natural gas data at the first site. For example, the temperature, pressure and corresponding component data of a part of the natural gas at the first site are obtained in historical production, and the data is used as sample data of the natural gas sample at the first site. Sample data of the natural gas sample at the first site may be acquired through the object platform corresponding to the first site, and for specific acquisition instructions, refer to the description of obtaining sample data of the natural gas sample at the second site in step 320.

In some embodiments, sample data at the second site and sample data at the first site are determined differently. For example, sample data at the first station may be obtained based on a gas chromatography experimental analysis method (an analysis method of a gas chromatography experiment), and sample data at the second site may be obtained by a gas chromatograph analysis.

In some embodiments, sample data of the natural gas sample is obtained by performing a gas chromatography experiment on the natural gas sample at the lower-level site. The sample data is the natural gas component and the temperature and pressure of the natural gas sample. It may be understood that compared with the gas chromatography method, the gas chromatography experiment on the natural gas sample is more convenient to operate, and the cost of the experiment is lower. Usually, considering the economic cost, the gas chromatography is only installed at the upper-level natural gas site (such as the second site), and the component analysis may be performed by the gas chromatography experiment at the lower-level site (such as the first site).

In some embodiments, the natural gas sample at the second site may be detected by the gas chromatography set at the upper-level site, to obtain sample data of the natural gas sample, which is the natural gas component and the temperature and pressure of the natural gas sample.

The classification and setting for the upper-level site and the lower-level site may be set in advance based on a predetermined evaluation rule. For example, comprehensive assessment and identification are made based on a gas supply area covered by the site, a site building scale, and a gas supply volume.

In some embodiments, sample data of the natural gas sample stored at the first site may be obtained through the object platform. For example, the object platform may be used as the corresponding sensor(s) to detect the temperature and pressure of the natural gas sample at the lower-level site. For another example, the object platform may extract the natural gas component and their temperature and pressure obtained by the gas chromatography at the upper-level site at a specified time.

Step 340, determining the natural gas component of the natural gas sample to be detected at the first site based on the sample data at the first site and the second site aggregated by the sensor network platform and the temperature and pressure of the natural gas sample to be detected at the first site.

Figure 8:
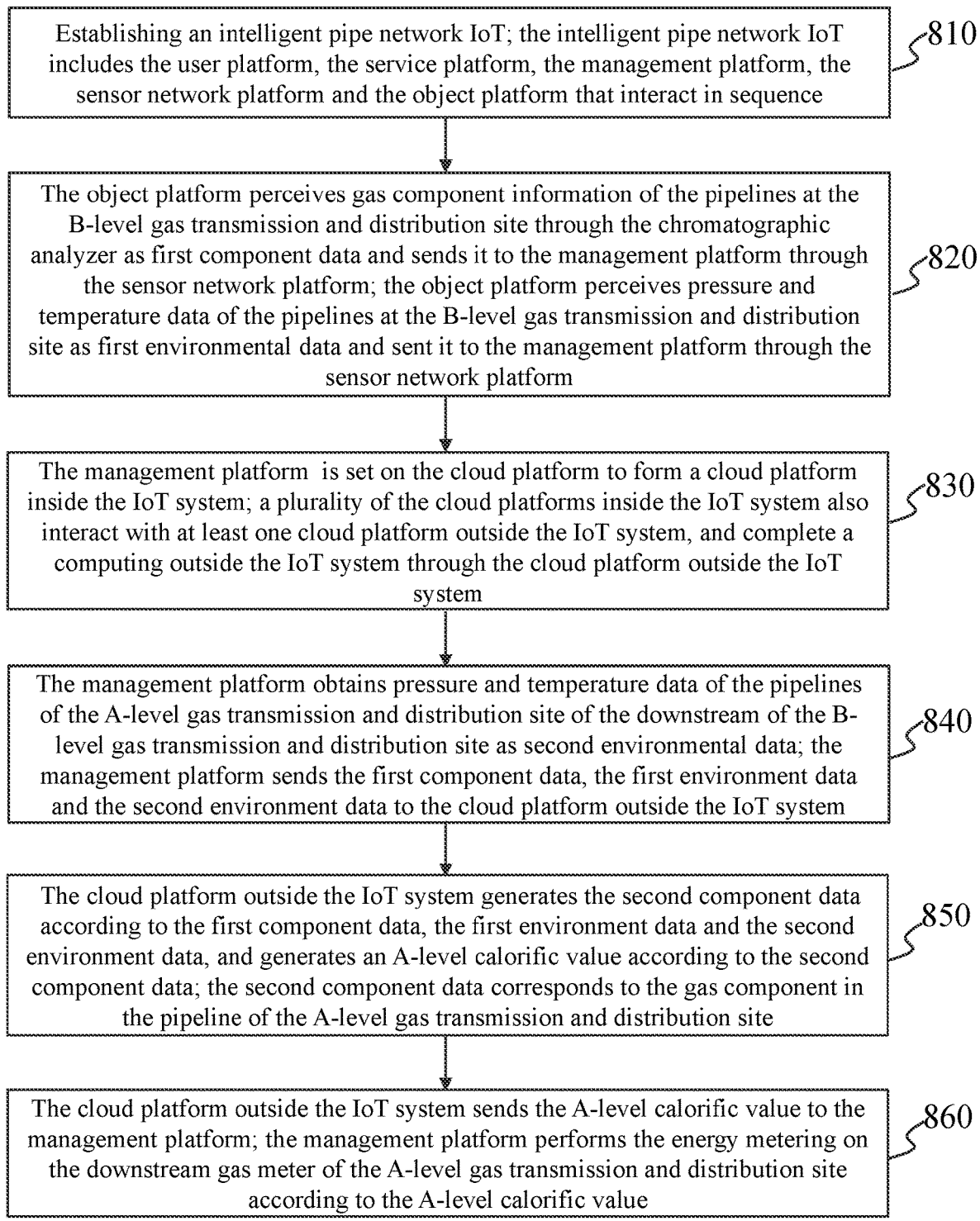
FIG. 8 is a schematic diagram illustrating steps of the method for sharing energy metering data of an intelligent pipe network across networks according to an embodiment of the present disclosure.

The natural gas component may be various flammable and non-flammable gas contained in the natural gas, for example, flammable low-molecular saturated hydrocarbon gases: methane, ethane, propane, butane, etc.; non-flammable non-hydrocarbon gases: carbon dioxide, carbon monoxide, nitrogen, hydrogen, etc. Even the same volume of the natural gas with the different components may produce different calorific values when burned, therefore, accurate energy metering may be obtained by determining the natural gas component, and then the specified metered natural gas may be transferred to other natural gas sites or regions. Referring to FIG. 8 and FIG. 9 for the description of realizing energy metering based on the natural gas component.

In some embodiments, the natural gas component of the natural gas sample to be detected at the first site may include content of hydrocarbon gas and non-hydrocarbon gas in the natural gas sample that requires component detection at the lower-level site. The natural gas component determined may be used to enable the lower-level site to accurately transmit the specified metered natural gas to other natural gas sites or regions.

In some embodiments, the management platform may determine the natural gas component of the natural gas sample to be detected at the first site based on sample data at the first site and the second site and the temperature and pressure of the natural gas sample to be detected at the first site in various ways. For example, the management platform may determine the natural gas component of the natural gas sample to be detected at the first site based on the method of look-up table interpolation.

In some embodiments, the method of look-up table interpolation includes building a table with acquired sample data of the natural gas sample, for example, using the acquired sample data at the first site and the second site (the natural gas component and its temperature and pressure) to build the table.

It may be understood that a table is constructed according to a pair of temperature and pressure values and the corresponding natural gas component, wherein a pair of temperature and pressure values in the constructed table corresponds to a set of natural gas component. For example, 20° C., 2000 pa correspond to the natural gas component A: 85% of methane, 10% of ethane, 3.5% of other polyalkanes, and 1.5% of other flammable gases such as hydrogen sulfide and hydrogen; 22° C., 2000 pa correspond to the natural gas component B: 85.1% of methane, 10.3% of ethane, 3.1% of other polyalkanes, and 1.5% of other flammable gases such as hydrogen sulfide and hydrogen.

Based on the temperature and pressure values of the natural gas sample to be detected, the look-up table interpolation is performed to obtain the natural gas component corresponding to the temperature and pressure values in the table, that is, the natural gas component of the natural gas sample to be detected. For example, if the temperature and pressure of the natural gas sample to be detected are 20° C. and 2000 pa, respectively, the corresponding natural gas component A may be used as the predicted component of the natural gas sample to be detected. For more instructions on determining the natural gas component of the natural gas sample to be detected, please refer to the contents of FIG. 4-FIG. 7.

In some embodiments, a table is built based on sample data of the known natural gas sample, and a non-detection method (such as corresponding relationship in the look-up table) may be used, thereby quickly and accurately determining the corresponding natural gas component under the certain temperature and pressure of the natural gas sample to be detected, and avoiding complex operations of experimentation or detecting. The component of the natural gas may then be obtained after pressure and temperature data are known, which is beneficial to saving testing cost, testing manpower and testing time.

In some embodiments, after the natural gas component of the natural gas sample to be detected is determined, the following operation steps may be further performed.

Step 350, determining the calorific value of the natural gas sample to be detected based on the natural gas component of the natural gas sample to be detected.

The amount of heat generated by natural gas samples can be the heat generated when the unit volume or mass of natural gas is burned. In some embodiments, the calorific value of the natural gas sample may be determined by the component of the natural gas. For example, the calorific value of the natural gas sample may be calculated from the component of the natural gas. The calculation of the calorific value may be completed by the cloud platform outside the IoT system, and the specific description refers to the relevant description in FIG. 8. It may be understood that accurate calorific value of the natural gas may be ensured by obtaining the accurate natural gas component.

In some embodiments, the calorific value of the natural gas sample to be detected may be generated based on component data of the natural gas sample to be detected through the cloud platform outside the IoT system.

In some embodiments, component data of the natural gas sample to be detected may be sent to the cloud platform outside the IoT system outside the system for obtaining the natural gas energy metering component, and the calorific value of the natural gas sample to be detected that is calculated and returned by the cloud platform outside the IoT system may be obtained. The detailed description of the cloud platform outside the IoT system may be related to the description in FIG. 8 and FIG. 11.

In some embodiments, the calorific value of the natural gas sample to be detected may be generated, based on component data of the natural gas sample to be detected, by the terminal having a data computing function (e.g., an external processor). It may be understood that component data of the natural gas sample to be detected may be sent to the external processor, and the calorific value calculated by the external processor and returned by the external processor may be obtained.

Step 360, performing the energy metering on the downstream gas meter based on the calorific value of the natural gas sample to be detected, and sending the energy metering result to the user platform through the service platform.

The downstream gas meter may be a device for recording and displaying the natural gas energy metering output from the natural gas site (for example, a lower-level natural gas site). It may be understood that the natural gas energy metering output from the natural gas lower-level site to the user's residential area may be recorded in real time on the downstream gas meter. Further, the user may know the value of the natural gas energy metering consumed in the current month through the downstream gas meter.

Energy metering may refer to the metering value of the calorific value of the natural gas, and it may be understood that energy metering of the natural gas is determined by the calorific value generated by the combustion of the natural gas in a specified volume. Further, the heat generation of the natural gas may depend on the content of flammable gases (e.g., methane, etc.) in the natural gas.

In some embodiments, the energy metering may be performed on the downstream gas meter based on the calorific value of the natural gas sample to be detected, and the energy metering result may be sent to the user platform through the service platform. It may be understood that the actual use of the natural gas by the user is calculated by means of energy metering, and further pricing is performed. For example, the obtained calculation result by multiplying the calorific value by a loss coefficient is used as the actual natural gas consumption of the user, wherein the loss coefficient may be set according to the actual situation or empirical value.

In some embodiments, the energy metering result may be sent to the user platform through the service platform, so that the user may observe the value of the natural gas energy metering used within a preset time on the user platform. For example, the service platform sends the natural gas energy metering result to the user platform every time it calculates, and the user platform may display the obtained natural gas energy metering result to the user in real time, so that the user may plan future gas consumption, or when abnormal gas consumption is counted, the abnormality may be reported through the user platform in time.

Figure 4:
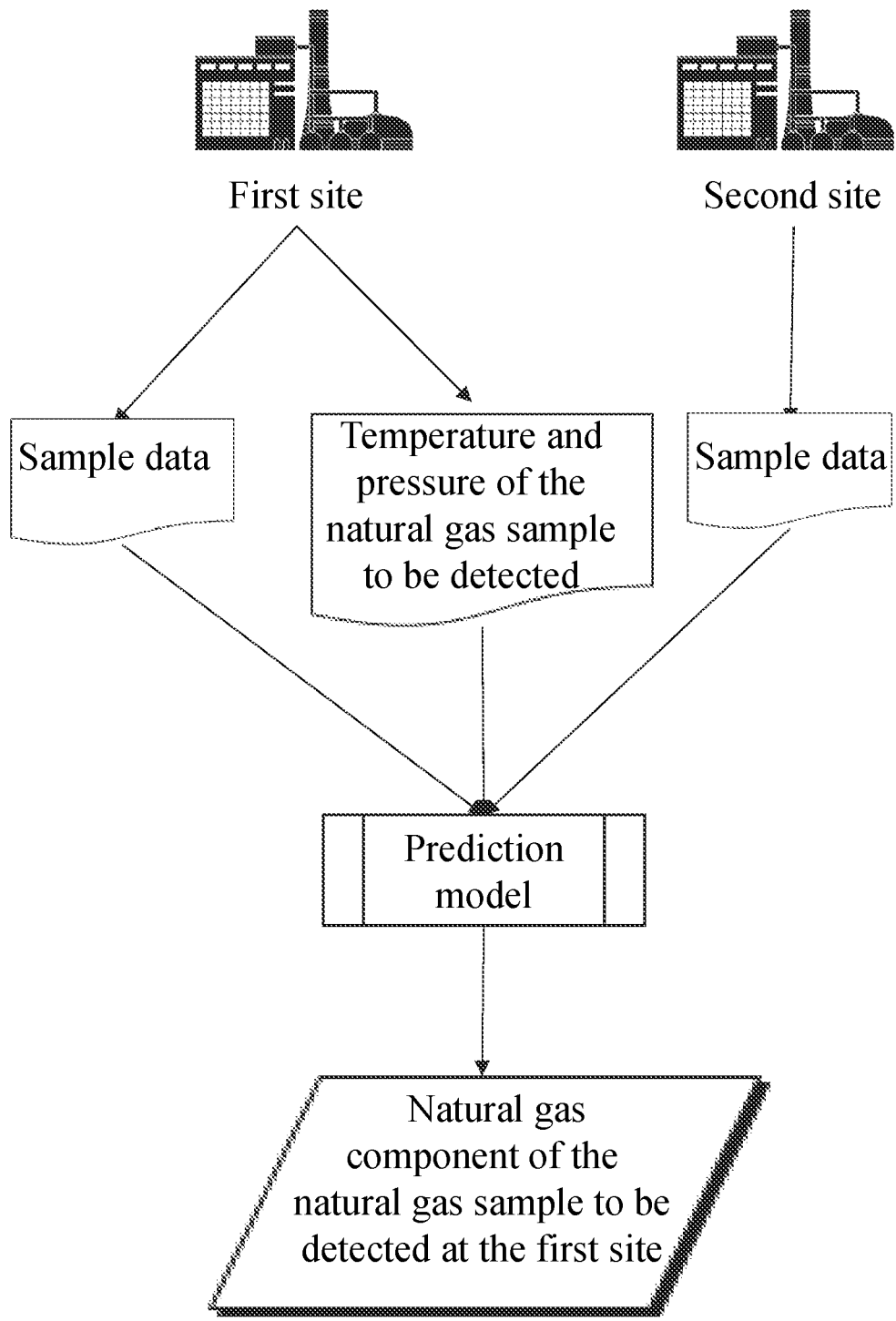
FIG. 4 is a flowchart illustrating the process of determining the component of the natural gas sample to be detected according to some embodiments of the present disclosure.

FIG. 4 is a flowchart illustrating the process of determining the component of the natural gas sample to be detected through the prediction model according to some embodiments of the present disclosure.

In some embodiments, the natural gas component of the natural gas sample to be detected may be determined by the prediction model based on sample data at the first site, the sample data at the second site, and the temperature and pressure of the natural gas sample to be detected at the first site.

Further, the prediction model may be a machine learning model, for example, a neural network, a deep neural network, or the like.

The input of the prediction model may be sample data at the first site, the second site (for example, the known natural gas sample component and the temperature and pressure of the known natural gas component), and the temperature and pressure of the natural gas sample to be detected at the first site; the output may be the natural gas component of the natural gas sample to be detected. It may be understood that the natural gas sample component at the first site, the second site and the temperature and pressure of the natural gas sample component, as well as the temperature and pressure of the natural gas sample to be detected at the first site are input into the prediction model, and the output of the natural gas component of the natural gas sample to be detected from the prediction model may be obtained.

In some embodiments, the prediction model may be trained based on sets of labeled training samples. Specifically, the labeled training samples are input into the prediction model, and the parameters of the prediction model are updated through training.

In some embodiments, a set of training samples may include: sample data of the known natural gas sample obtained from the first site and the second site, and then randomly occlude component data in part of sample data, and the sample of occluded component data is used as the sample to be detected during training. In some embodiments, the training sample may be obtained from the first site and the second site, for example, sample data of multiple groups of natural gas samples obtained from the first site and the second site through the object platform, including the corresponding component data of the natural gas sample under multiple sets of temperature and pressure.

In some embodiments, the label during model training may be the above-mentioned occluded component value.

In some embodiments, the label may be obtained by measuring the natural gas sample component of the natural gas sample, for example, obtained through the gas chromatography experiment, or the like.

In some embodiments, the prediction model may be trained by various methods (e.g., gradient descent) to update model parameters based on the above-mentioned sample.

In some embodiments, the training ends when the prediction model under training satisfies a preset condition. The prediction condition may be that the result of the loss function converges or is smaller than a preset threshold, or the like.

According to the above description, by training the prediction model by a large number of training samples based on the inputted sample data at the first site, known sample data at the second site, and the temperature and pressure of the natural gas sample to be detected at the first site, the more accurate natural gas component of the natural gas sample to be detected from the prediction model may be quickly obtained, and the accuracy and efficiency of obtaining the natural gas component of the natural gas sample may be improved, thereby improving the accuracy of natural gas energy metering and its pricing.

FIG. 5 is a flowchart illustrating the process of obtaining the temperature and pressure of the natural gas sample to be detected at the first site according to some embodiments of the present disclosure.

As shown in FIG. 5, in some embodiments, the method for obtaining the temperature and pressure of the natural gas sample to be detected at the first site may include: performing reduction processing on the natural gas sample to be detected, and obtaining a plurality of natural gas samples to be detected at multiple temperatures and pressures during the reduction process.

The reduction processing may be a process of changing the temperature and pressure of the natural gas sample to be detected to the temperature and pressure during extraction. The temperature and pressure during extraction refer to the temperature and pressure when the natural gas is obtained from the upper-level site. Due to the different storage conditions and transportation conditions of each site, changes in natural gas transportation and storage conditions will lead to changes in temperature and pressure, bringing certain error in component measurement. By reducing the temperature and pressure of the natural gas sample to be detected to the temperature and pressure during extraction, the error in component measurement caused by changes of temperature and pressure may be reduced, thereby improving the accuracy of the natural gas component of the natural gas sample to be detected.

In some embodiments, the temperature and pressure of the natural gas sample during extraction may be recorded at the site where they are stored. For example, temperature and pressure data during extraction of the natural gas sample to be detected may be obtained based on data recorded at the first site or the second site.

In some embodiments, the reduction processing may include operations such as increasing pressure, reducing pressure, increasing temperature, and decreasing temperature, etc. For example, the current temperature and pressure of the natural gas sample to be detected obtained from the first site are 20° C. and 2300 pa, and the temperature and pressure of the natural gas sample to be detected during extraction (without reduction processing) obtained based on data stored at the first site are 23° C. and 2000 pa, respectively. Therefore, the natural gas sample to be detected needs to be increased temperature and reduced pressure.

A plurality of temperatures and pressures in the reduction process may be determined according to the preset data collection condition. For example, if a preset data collection condition is that during the reduction process, sample data is collected once every time the temperature changes by 1 degree Celsius or the pressure changes by 100 Pa, then the sample data under a plurality of temperature and pressure may be obtained during the reduction process based on the preset data collection condition. Merely by way of example, the preset data collection condition is that sample data is collected once every time the temperature changes by 0.5 degree Celsius, the multiple temperature during the reduction process in the above example may be 20.5° C., 21° C., 21.5° C., 22° C., and 22.5° C., and the corresponding pressure may be the pressure of the corresponding natural gas sample to be detected when the temperature of the natural gas sample to be detected changes to the above temperature.

In some embodiments, a plurality of temperature and pressure of the natural gas sample to be detected may be acquired during the reduction process, and the natural gas sample to be detected under the plurality of temperatures and pressures may be used as a plurality of natural gas samples to be detected. Taking the above example as an example, in the process of reducing the temperature and pressure of the natural gas sample from 20° C., 2300 pa to 23° C., 2000 pa, the temperatures and pressures during the reduction process may be obtained as 20.5° C., 2250 pa, 21° C., 2200 pa, 21.5° C., 2150 pa, 22° C., 2100 pa and 22.5° C., 2050 pa. The natural gas sample under the above-mentioned multiple temperature and pressure may be used as the obtained multiple natural gas samples to be detected during the reduction process.

In some embodiments, it may be understood that the reduction treatment may make the temperature and pressure of the natural gas sample closer to the temperature and pressure during extraction, reducing errors caused by changes in the temperature and pressure of the sample storage environment, and further improving the accuracy of the predictive component data.

In some embodiments, multiple tests may be performed during the reduction processing to predict the component of the natural gas sample to be detected at corresponding temperature and pressure.

Multiple tests may be performed respectively on the natural gas sample at different temperature and pressure during the reduction processing to obtain the component of the natural gas sample to be detected at the corresponding temperature and pressure. For example, multiple tests may be performed by the gas chromatography experiment. Merely by way of example, the components of the natural gas sample under the above-mentioned multiple sets of temperature and pressure (such as 20.5° C., 2250 pa, 21° C., 2200 pa, 21.5° C., 2150 pa, 22° C., 2100 pa, and 22.5° C., 2050 pa) may be tested separately, to get multiple sample data.

The predicted component may be predicted or tested for the natural gas component at different temperature and pressure, and the obtained natural gas component may be used as the corresponding component at the corresponding temperature and pressure. For example, the component of the natural gas sample to be detected under a temperature and pressure of 20.5° C. and 2250 pa may be tested to obtain the component data A, and in this way, the component of the natural gas sample to be detected under the condition of 21° C. and 2200 pa may be tested to obtain data B, etc., respectively.

In some embodiments, the natural gas component corresponding to the natural gas to be detected at the multiple temperatures and pressures may be obtained through multiple tests, so that each group of the natural gas sample to be detected (including the corresponding temperature, pressure and the natural gas component) as the known sample, which may reduce errors due to insufficient sample size. For example, the natural gas component corresponding to the natural gas to be detected at multiple temperatures and pressures obtained from multiple tests may be used as the data source for the above-mentioned look-up table interpolation, to increase the number of data in the built data table and improve the accuracy of the data table.

In some embodiments, the temperature and pressure when the natural gas sample to be detected is extracted, multiple temperatures and pressures of the natural gas samples to be detected, and corresponding component data may be processed based on a machine learning model, to predict component data when the natural gas sample to be detected is extracted.

Component data during extraction (that is, component data when the natural gas sample to be detected is extracted) may be component data corresponding to the temperature and pressure of the natural gas sample to be detected during extraction, and based on component data during extraction, more accurate energy metering data may be obtained, and more accurate pricing data may be obtained.

In some embodiments, the machine learning model may be the neural network or the deep neural network.

In some embodiments, the input of the machine learning model may be the temperature and pressure when the natural gas sample to be detected is extracted, as well as multiple temperatures, pressures and corresponding component data of the natural gas sample to be detected during the reduction process, wherein a plurality of temperatures, pressures and corresponding component data of the natural gas sample to be detected during the reduction process may be represented by sample data 1, sample data 2, . . . sample data n, respectively. Taking the foregoing example as an example, sample data 1 may include the following data: 20.5° C., 2250 pa, component data A; sample data 2 may include the following data: 21° C., 2200 pa, component data B.

The output of the machine learning model may be component data when the sample to be detected is extracted. It may be understood that the temperature and pressure when the natural gas sample to be detected is extracted, and a plurality of temperatures, pressures and corresponding component data of the natural gas sample to be detected during the reduction process are input into the machine learning model, and the natural gas component during extraction of the natural gas sample to be detected may be output from the machine learning model.

In some embodiments, the machine learning model may be trained based on sets of labeled training samples. Specifically, the labeled training samples are input into the machine learning model, and the parameters of the machine learning model are updated through training.

In some embodiments, a set of training samples may include the temperature and pressure during extraction of the historical natural gas sample to be detected, and a plurality of temperature, pressure and the corresponding component of the historical natural gas sample to be detected during the historical reduction process.

In some embodiments, the label may be the natural gas component during extraction of the historical natural gas sample to be detected.

In some embodiments, the label may be obtained by detecting the component of the natural gas sample to be detected during extraction, for example, obtaining the natural gas component during extraction through the gas chromatography experiment.

In some embodiments, the machine learning model may be trained by various methods (e.g., gradient descent) to update model parameters based on the above-mentioned sample.

In some embodiments, the training ends when the machine learning model under training satisfies the preset condition. The preset condition may be that the result of the loss function converges or is smaller than a preset threshold, or the like.

In some embodiments, the accuracy and efficiency of predicting component data of the temperature and pressure during extraction of the natural gas sample to be detected by the machine learning model is higher than that of analyzing component data during extraction by an experimental method (e.g., the gas chromatography experiment).

Figure 6:
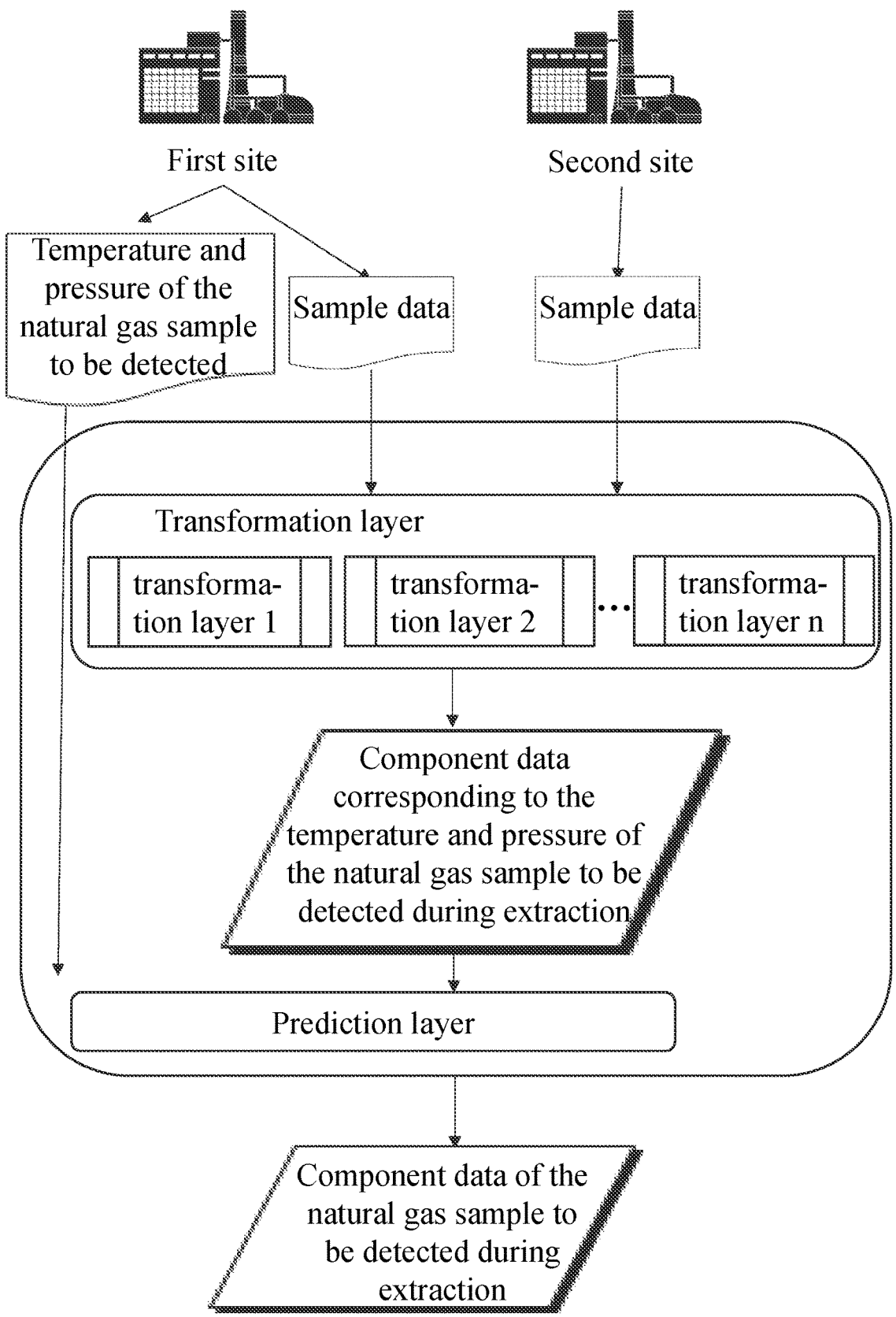
FIG. 6 is a flowchart illustrating the process of obtaining component data of the natural gas sample to be detected during extraction according to some embodiments of the present disclosure.

FIG. 6 is a flowchart illustrating the process of obtaining the component of the natural gas sample to be detected during extraction according to some embodiments of the present disclosure.

In some embodiments, sample data of the natural gas sample at the first site, sample data of the natural gas sample at the second site, and the temperature and pressure of the natural gas sample to be detected may be processed by the prediction model, to predict component data of the natural gas sample to be detected during extraction. As shown in FIG. 6, the prediction model may include multiple transformation layers and prediction layers.

In some embodiments, the prediction model may be the deep neural network. In some embodiments, the prediction model may include multiple transformation layers and prediction layers.

In some embodiments, the prediction model may also be a combination of multiple models, and merely by way of example, the prediction model may be a combination of multiple transformation layer models and prediction layer models.

In some embodiments, the input of the prediction model may be the temperature and pressure of the natural gas sample to be detected, as well as sample data (including the natural gas component and the temperature and pressure of the natural gas component) at the first site and the second site, and the output may be component data when the natural gas sample to be detected is extracted.

In some embodiments, the input to the plurality of transformation layers may be sample data of the known natural gas sample (e.g., the natural gas component at the first site, the second site and the temperature and pressure of the natural gas component), and the output may be the predicted temperature, pressure, and component data (e.g., the reduced temperature, pressure, and component data) of the known natural gas sample during extraction based on input sample data of the known natural gas sample. The input of the prediction layer may include the temperature and pressure of the natural gas sample to be detected and the output of the transformation layer (that is, the temperature, pressure and component data of the known natural gas sample during extraction). The output of the prediction layer may be component data of the natural gas sample to be detected during extraction.

In some embodiments, the training of the prediction model may be pre-training the transformation layer first, and then jointly training the transformation layer and the prediction layer.

The pre-training of the transformation layer may be to preset the parameters of the prediction layer first, and then train the transformation layer according to the labeled training sample. The training sample may be sample data of multiple known natural gas samples at the first site and the second site during extraction, component data during extraction in a part of sample data may be occluded, and the known sample of occluded component data may be used as the sample to be evaluated. The label of the training sample of the transformation layer may be the value of occluded component data. In some embodiments, the parameters of the transformation layer may be updated by training through various methods (e.g., gradient descent) based on the above-mentioned sample. In some embodiments, the training ends when the transformation layer under training satisfies the preset condition. The preset condition may be that the result of the loss function converges or is smaller than the preset threshold, or the like.

In some embodiments, the pre-trained at least one transformation layer and the prediction layer may be jointly trained end-to-end. Specifically, in a round of iterative training, the training sample include: a plurality of known sample data and sample data to be evaluated, wherein the sample data of the known natural gas sample at the first site and the second site (including the natural gas component and the temperature and pressure) may be used as known sample data. By occluding component data of a part of the natural gas sample of known component data during extraction, the natural gas sample of known sample data during extraction of occluded component data may be used as sample data to be evaluated. The above-mentioned multiple known sample data are input into multiple transformation layers, respectively, the sample data to be evaluated is input into the prediction layer, and the loss function a of at least one transformation layer (multiple transformation layers may correspond to multiple loss functions, such as a1, a2, a3, etc.), and the loss function b of the prediction layer is determined. By processing the loss function a and the loss function b, a joint loss function is constructed.

In some embodiments, when the loss function a and the loss function b are processed, weights may also be assigned to the two loss functions, for example, the two are equally weighted. The weights may be pre-determined to reflect the different importance of the two to the prediction model. In some embodiments, the joint loss function $Loss_c$ may be expressed as: $Loss_c = Loss_A + Loss_B$.

Further, the parameters of the prediction model are updated based on the joint loss function, and since the transformation layer has been pre-trained, during the joint training, the parameters of the model may be updated by mainly updating the parameters of the prediction layer.

In some embodiments, when the prediction model has multiple transformation layers and prediction layers, to make each model layer of the prediction model more targeted, the prediction accuracy of each layer and the accuracy of the overall output of the prediction model are improved. Further, the model training is more concise by adopting an end-to-end joint training approach.

Figure 7:
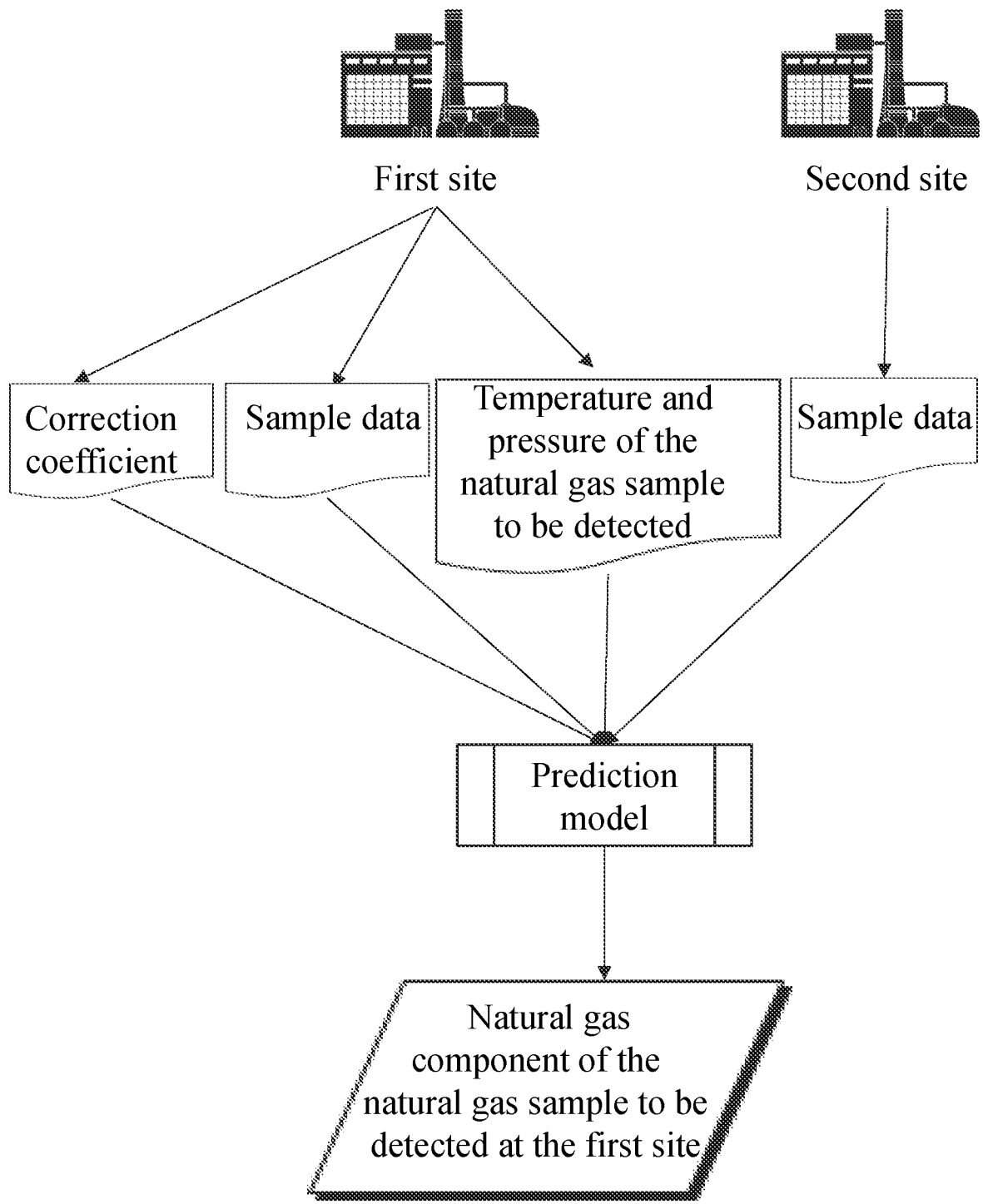
FIG. 7 is a flowchart illustrating the process of obtaining the component of the natural gas sample to be detected according to some embodiments of the present disclosure.

FIG. 7 is a flowchart illustrating the process of obtaining the component of the natural gas to be detected according to some embodiments of the present disclosure.

In some embodiments, the natural gas component of the natural gas sample to be detected is determined by the prediction model based on sample data at the first site, sample data at the second site, and the temperature and pressure of the natural gas sample to be detected at the first site including: determining the natural gas component of the natural gas sample to be detected, through the prediction model, based on the correction coefficient, sample data at the first site, sample data at the second site, and the temperature and pressure of the natural gas sample to be detected at the first site. The correction coefficient is determined based on the temperature and/or pressure of the natural gas sample to be detected before reduction and the temperature and/or pressure during extraction.

The correction coefficient may be a reference factor used by the prediction model as a degree to which the natural gas component of the natural gas sample to be detected is corrected. In some embodiments, the correction coefficient may be related to the difference between the temperature or pressure of the natural gas sample to be detected before reduction and during extraction.

In some embodiments, the correction coefficient may be the difference values of the temperature or pressure of the natural gas sample to be detected before reduction compared with the temperature or pressure during extraction.

In some embodiments, taking the above example as an example, the temperature and pressure of the natural gas sample to be detected before reduction are 20° C. and 2300 pa, and the temperature and pressure during extraction are 23° C. and 2000 pa. It may be understood that the correction coefficient may be 23° C.-20° C.=3, or 2000 pa-2300 pa=−300, and it may be seen that the correction coefficient may be 3 or −300.

In some embodiments, the temperature and pressure of the natural gas sample to be detected before reduction are respectively subtracted from the temperature and pressure during extraction, and the difference values of the temperature and the pressure are weighted to obtain the correction coefficient.

In some embodiments, taking the above example as an example, the temperature and pressure of the natural gas sample to be detected before reduction are 20° C. and 2300 pa, and the temperature and pressure during extraction are 23° C. and 2000 pa. It may be understood that the correction coefficient determined based on the temperature change is −3, and the correction coefficient determined based on the pressure change is 300; then the two correction coefficients may be weighted and summed to obtain the final correction coefficient. For example, based on historical experience to judge the comparison between temperature change and pressure change, the effect of temperature change on the natural gas component is small, then a relatively small weight may be assigned to the correction coefficient determined based on the temperature, such as 0.2, correspondingly, a larger weight may be assigned to the correction coefficient determined based on the pressure, such as 0.8, then the final correction coefficient is 239.4 (−3*0.2+300*0.8=239.4).

In some embodiments, the input of the prediction model may include the correction coefficient, sample data of the natural gas sample at the first site, sample data of the natural gas sample at the second site, and temperature and pressure of the natural gas sample to be detected at the first site; the output may be the natural gas component of the natural gas sample to be detected.

In some embodiments, a set of training samples may include: sample data of the known natural gas sample obtained from the first site and the second site, and component data of sample data that is randomly occluded in part, and the sample of occluded component data is used as the sample to be detected during training, the correction coefficient of the natural gas sample to be detected, and the label may be the value of the occluded component.

It may be understood that the prediction model is similar to the prediction model in FIG. 4, and for the detailed description of the training method of the prediction model, please refer to the relevant description in FIG. 4. In some embodiments, the correction coefficient of the natural gas sample to be detected is added to the prediction model, which may further provide a prediction basis for the prediction model, which is beneficial to improve the prediction accuracy.

In some embodiments, the method for obtaining natural gas energy metering component may also be used as a method for sharing energy metering data of an intelligent pipe network across networks. In some embodiments, the first site may also be used as a A-level gas transmission and distribution site; the second site may also be used as a B-level gas transmission and distribution site.

In some embodiments, sample data of the natural gas sample at the second site may also be used as gas component information of the pipeline of the B-level gas transmission and distribution site, that is, first component data. In some embodiments, temperature and pressure data of the natural gas sample at the second site may also be used as pressure and temperature data of the pipeline at the B-level gas transmission and distribution site, that is, first environment data.

In some embodiments, temperature and pressure data of the natural gas sample to be detected at the first site may also be used as pressure and temperature data of the pipeline of the A-level gas transmission and distribution site, that is, second environmental data. In some embodiments, natural gas component data of the natural gas sample to be detected at the first site may also be used as gas component data in the pipeline of the A-level gas transmission and distribution site, that is, second component data.

Figure 11:
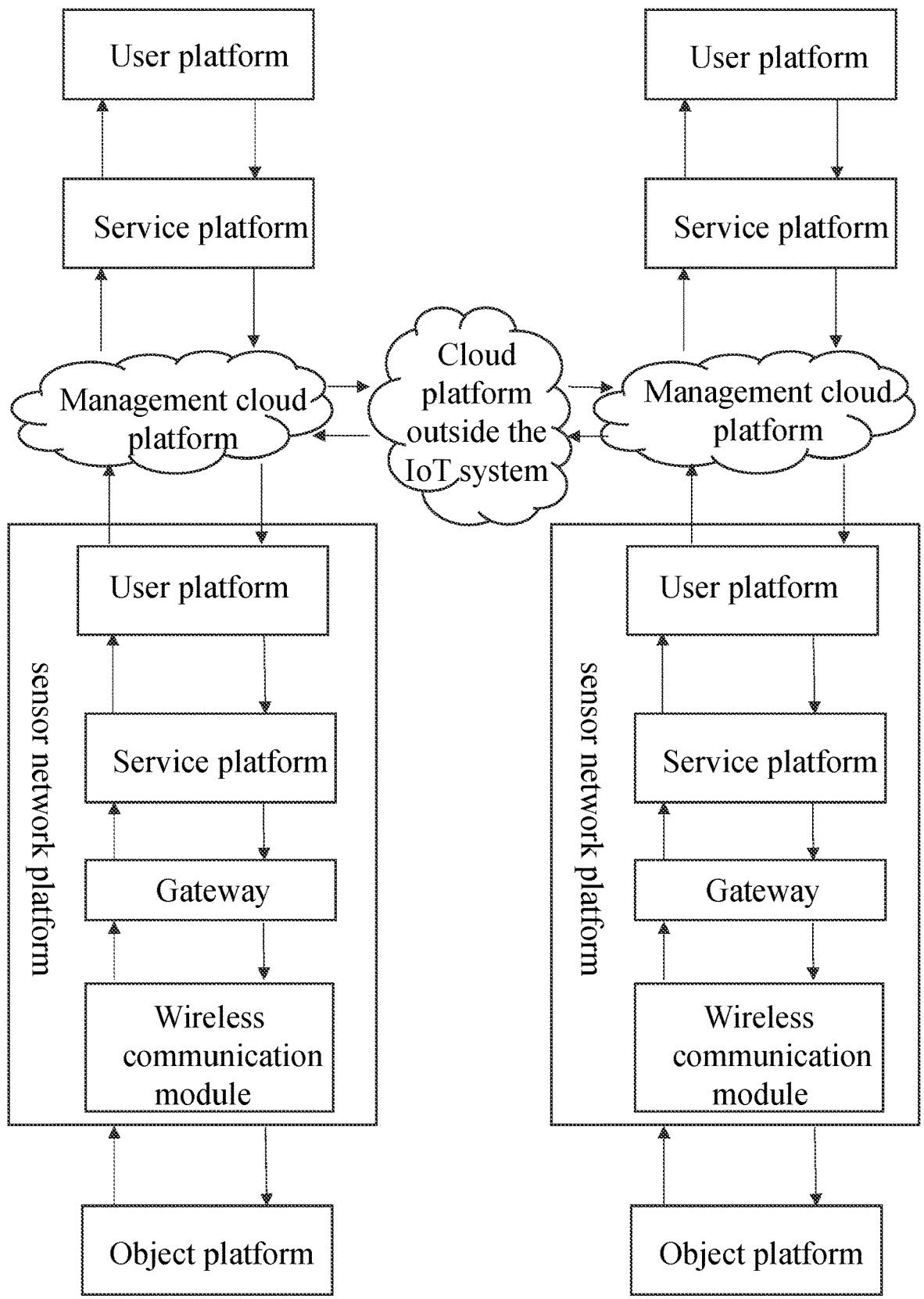
FIG. 11 is a schematic diagram illustrating a system architecture according to an embodiment of the present disclosure.

To facilitate the elaboration of the above-mentioned the method for sharing energy metering data of the intelligent pipe network across networks, please refer to FIG. 8, which shows a schematic diagram illustrating steps of the method for sharing energy metering data of the intelligent pipe network across networks according to an embodiment of the present disclosure, and the method for sharing energy metering data of the intelligent pipe network across networks may be applied to the communication architecture in FIG. 11, and further, the method for sharing energy metering data of the intelligent pipe network across networks may specifically include the following steps 810-860.

Step 810: establishing an intelligent pipe network IoT; the intelligent pipe network IoT includes the user platform, the service platform, the management platform, the sensor network platform and the object platform that interact in sequence.

Step 820: the object platform perceives gas component information of the pipelines at the B-level gas transmission and distribution site through the chromatographic analyzer as first component data and sends it to the management platform through the sensor network platform; the object platform perceives pressure and temperature data of the pipelines at the B-level gas transmission and distribution site as first environmental data and sent it to the management platform through the sensor network platform.

Step 830: the management platform is set on the cloud platform to form a cloud platform inside the IoT system; a plurality of the cloud platforms inside the IoT system also interact with at least one cloud platform outside the IoT system, and complete a computing outside the IoT system through the cloud platform outside the IoT system.

Step 840: the management platform obtains pressure and temperature data of the pipelines of the A-level gas transmission and distribution site of the downstream of the B-level gas transmission and distribution site as second environmental data; the management platform sends the first component data, the first environment data and the second environment data to the cloud platform outside the IoT system.

Step 850: the cloud platform outside the IoT system generates the second component data according to the first component data, the first environment data and the second environment data, and generates an A-level calorific value according to the second component data; the second component data corresponds to the gas component in the pipeline of the A-level gas transmission and distribution site.

Step 860: the cloud platform outside the IoT system sends the A-level calorific value to the management platform; the management platform performs the energy metering on the downstream gas meter of the A-level gas transmission and distribution site according to the A-level calorific value.

Based on the existing gas transmission and distribution environment, there are huge differences between the component of the gas sources, although the natural gas itself is dominated by methane, based on the existing standard, the methane volume fraction in the natural gas only needs to reach 70%, so the component of different gas sources varies greatly, for example, 75%-80% of the methane volume fraction of the associated natural gas in Daqing Oilfield, above 98% of the methane volume fraction of the associated natural gas in Karamay Oilfield, 90-98% of the methane volume fraction of the main natural gas in the Sichuan Basin, and more than 90% of the methane volume fraction of imported Russian natural gas. The result of different gas component is that in the process of gas transmission and distribution, the compression factors of different gases are different, and the final calorific value of the gas in the gas pipeline at the lower-level site changes compared with that of the gas pipeline at the upper-level site, although the final change value is about 0.5%, there will be differences when the overall energy metering is calculated.

There are also some differences in the temperature and pressure of the gas pipelines at the upper-level and lower-level sites, the volume change is generally calculated through the actual gas state equation in practical projects, and the error in natural gas metering by volume is small, but during the energy metering, since natural gas as a mixed gas has different compression factors in the actual gas state equation, the volume component of the mixed gas will change slightly when the temperature and pressure change, resulting in a change in the calorific value.

In the implementation of an embodiment of the present disclosure, the chromatographic analyzer is installed at the B-level gas transmission and distribution site, and the gas component at the B-level gas transmission and distribution site is sampled and analyzed, and the sampling and analysis technology belongs to the prior art, and will not be repeated here; the sampled results will be normalized by the chromatographic analyzer according to the volume component to form each gas component as first component data; at the same time, to facilitate the calculation, it is also necessary to obtain pressure and temperature data of the pipelines at the B-level gas transmission and distribution site as first environmental data.

Relevant data of the pipelines at the B-level gas transmission and distribution site is shared to the management platform through the IoT, and the management platform also obtains pipeline pressure and temperature data of the A-level gas transmission and distribution site, which is the downstream site of the B-level gas transmission and distribution site, as second temperature data.

The component of pipelines at the A-level gas transmission and distribution site may be obtained by performing data calculation through first component data, first environmental data and second environmental data, and in this embodiment, this computing process requires relatively large computing resources, so this embodiment makes full use of the advantages of the computing outside the IoT system, and the computing of second component data is performed by the cloud platform outside the IoT system; similarly, the computing process of generating A-level calorific value according to second component data is also completed by the cloud platform outside the IoT system.

The management platform built on the cloud platform inside the IoT system calculates the gas energy of each gas meter under the A-level gas transmission and distribution site according to the A-level calorific value, and in this embodiment, the A-level gas transmission and distribution site is generally the gas transmission and distribution pipeline of the last stage of the gas pipeline. The present disclosure finally realizes the calorific value analysis in the downstream gas pipeline and improves the energy metering accuracy at the terminal by analyzing the component in the upstream gas pipeline, and then obtaining temperature and pressure data at various places.

In one embodiment, referring to FIG. 9, the following sub-steps are included.

Step 910: establishing a service platform A, a management platform A and a sensor network platform A on the cloud platform inside the IoT system; establishing a user platform A and an object platform A on the two platforms interacting with the cloud platform inside the IoT system, respectively.

Step 920: the user platform A, the service platform A, the management platform A, the sensor network platform A, and the object platform A interact in sequence, and the sensor network platform A perceives and receives data of the object platform A, and sends it to the management platform A; the management platform A performs arithmetic processing on data of the object platform A and sends the data to the user platform A through the service platform A.

In one embodiment, referring to FIG. 10, the following sub-steps are also included.

Step 1010: establishing a user platform B and an object platform B on the management platform A, and establishing a service platform B, a management platform B, and a sensor network platform B on the cloud platform outside the IoT system; the user platform B, the service platform B, the management platform B, the sensor network platform B and the object platform B interact in sequence.

In one embodiment, the management platform B extracts volume fraction data of multiple groups of different gases from first component data as gas classification data.

The management platform B obtains compression parameters that match the different gases in gas classification data and first environment data as a first compression parameter, and obtains compression parameters that match the different gases in gas classification data and second environment data as a second compression parameter.

The management platform B inputs first environmental data, second environmental data, gas classification data, the first compression parameter and the second compression parameter into a component correction model preset in the management platform B to generate second component data.

In the implementation of this embodiment, volume fraction data of different gases are first extracted as gas classification data, and the gas with similar compression factor may be classified into one category in the classification standard, or may be classified according to the arrangement of the volume fraction. For example, methane has the compression factor of 0.9981 at 20° C., ethane has the compression factor of 0.992 at 20° C., propane has the compression factor of 0.9834 at 20° C., carbon dioxide has the compression factor of 0.9944 at 20° C., hydrogen sulfide has the compression factor of 0.99 at 20° C., and nitrogen has the compression factor of 0.99 at 20° C., then ethane and hydrogen sulfide with similar compression factor may be combined; for another example, the volume fraction of methane in a natural gas is 85%, ethane is 10%, other polyalkanes are 3%, and other combustible gases such as hydrogen sulfide and hydrogen are 1.5%, then methane is classified as one category, ethane is classified as one category, and the other polyalkanes are combined into one category, and this method is tested to be more accurate than the implementation of the combination by the compression factor.

In this embodiment, the compression parameters of different gases are obtained according to different environmental data, and then final data is generated through the component correction model, and the main idea of this embodiment is to calculate the different gases in the mixed gas separately, do the mixed calculation finally to improve the accuracy of the final result.

In one embodiment, gas classification data includes methane data, ethane data, polyalkane data, other flammable data, and non-flammable data; the compression parameters include the compression factor and a second virial coefficient.

When the management platform B inputs first environment data, second environment data, gas classification data, the first compression parameter and the second compression parameter into the component correction model, the management platform B performs the actual gas equation of state operation on each type of classified data through the component correction model to obtain actual volume fraction data of each type of classified data corresponding to the second compression parameter.

The management platform B combines actual volume fraction data corresponding to each classification data through the second virial coefficient to form second component data through the component correction model.

In the implementation of this embodiment, different gases are classified according to gas types to form gas classification data, and in the component correction model, the actual gas state equation is used to calculate and adjust the volume fraction of each gas, and then integrated through the second virial coefficient to form complete second component data, and the subsequent cloud platform outside the IoT system may calculate the A-level calorific value according to second component data.

Based on the same inventive concept, referring to FIG. 11, one embodiment of the present disclosure also provides a system for sharing energy metering data of an intelligent pipe network across networks, which includes the following steps.

The intelligent pipe network IoT is configured to include the user platform, the service platform, the management platform, the sensor network platform and the object platform that interact in sequence.

The object platform perceives gas component information of the pipelines at the B-level gas transmission and distribution site through the chromatographic analyzer as first component data and sends it to the management platform through the sensor network platform; the object platform perceives pressure and temperature data of the pipelines at the B-level gas transmission and distribution site as first environmental data and sent it to the management platform through the sensor network platform.

The management platform is set on the cloud platform to form the cloud platform inside the IoT system; a plurality of the cloud platforms inside the IoT system also interact with at least one cloud platform outside the IoT system, and complete the computing outside the IoT system through the cloud platform outside the IoT system.

The management platform obtains pressure and temperature data of the pipelines of the A-level gas transmission and distribution site of the downstream of the B-level gas transmission and distribution site as second environmental data; the management platform sends the first component data, the first environment data and the second environment data to the cloud platform outside the IoT system.

The cloud platform outside the IoT system generates the second component data according to the first component data, the first environment data and the second environment data, and generates a A-level calorific value according to second component data; the second component data corresponds to the gas component in the pipeline of the A-level gas transmission and distribution site.

The cloud platform outside the IoT system sends the A-level calorific value to the management platform; the management platform performs the energy metering on the downstream gas meter of the A-level gas transmission and distribution site according to the A-level calorific value.

Figure 12:
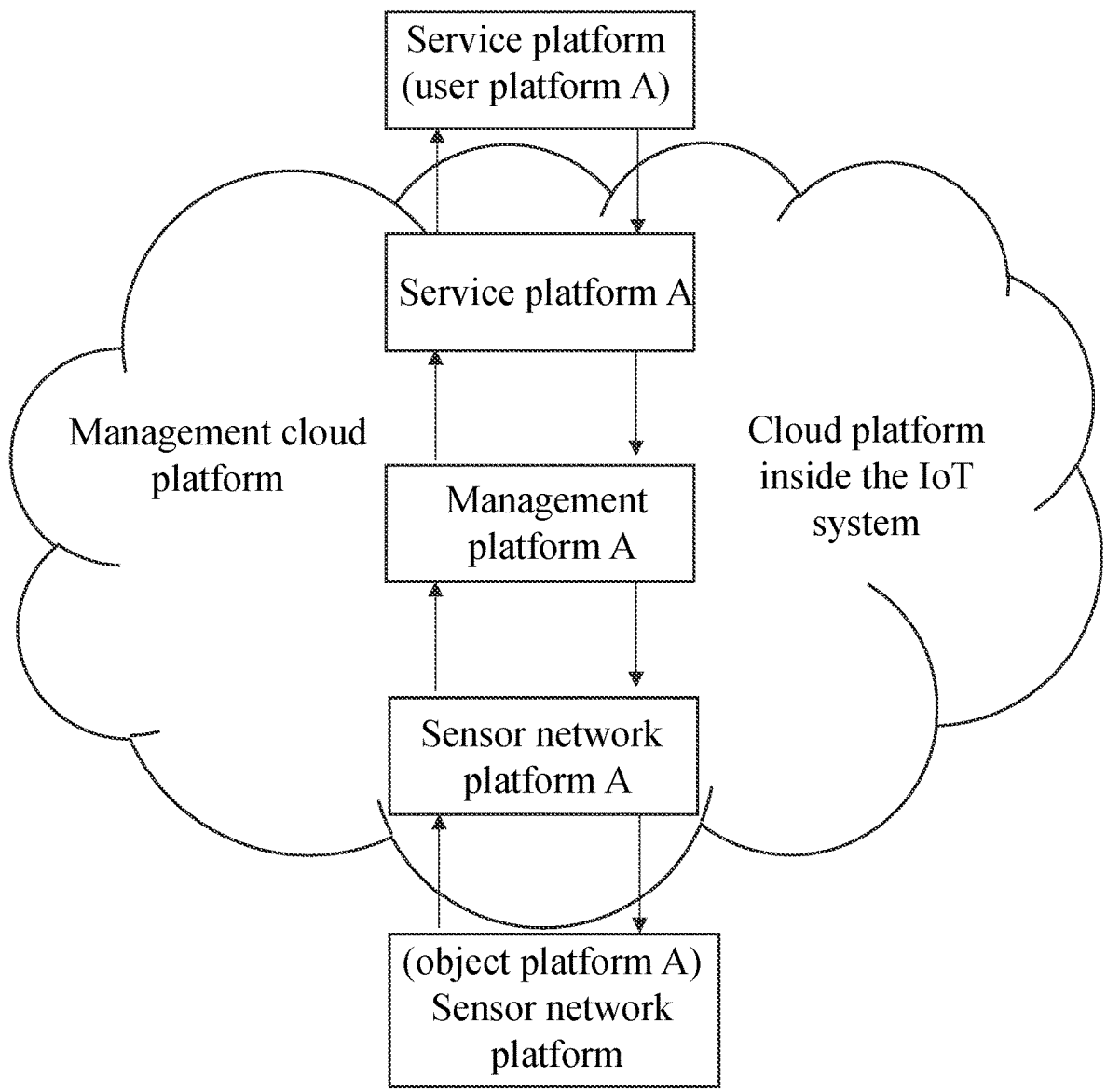
FIG. 12 is a schematic diagram illustrating a system architecture according to an embodiment of the present disclosure.

In one embodiment, referring to FIG. 12, the service platform A, the management platform A and the sensor network platform A are established on the cloud platform inside the IoT system, and the user platform A and the object platform A are respectively established on the two platforms interacting with the cloud platform inside the IoT system.

The user platform A, the service platform A, the management platform A, the sensor network platform A, and the object platform A interact in sequence, and the sensor network platform A perceives and receives the data of the object platform A, and sends it to the management platform A; the management platform A performs arithmetic processing on the data of the object platform A and sends the data to the user platform A through the service platform A.

Figure 13:
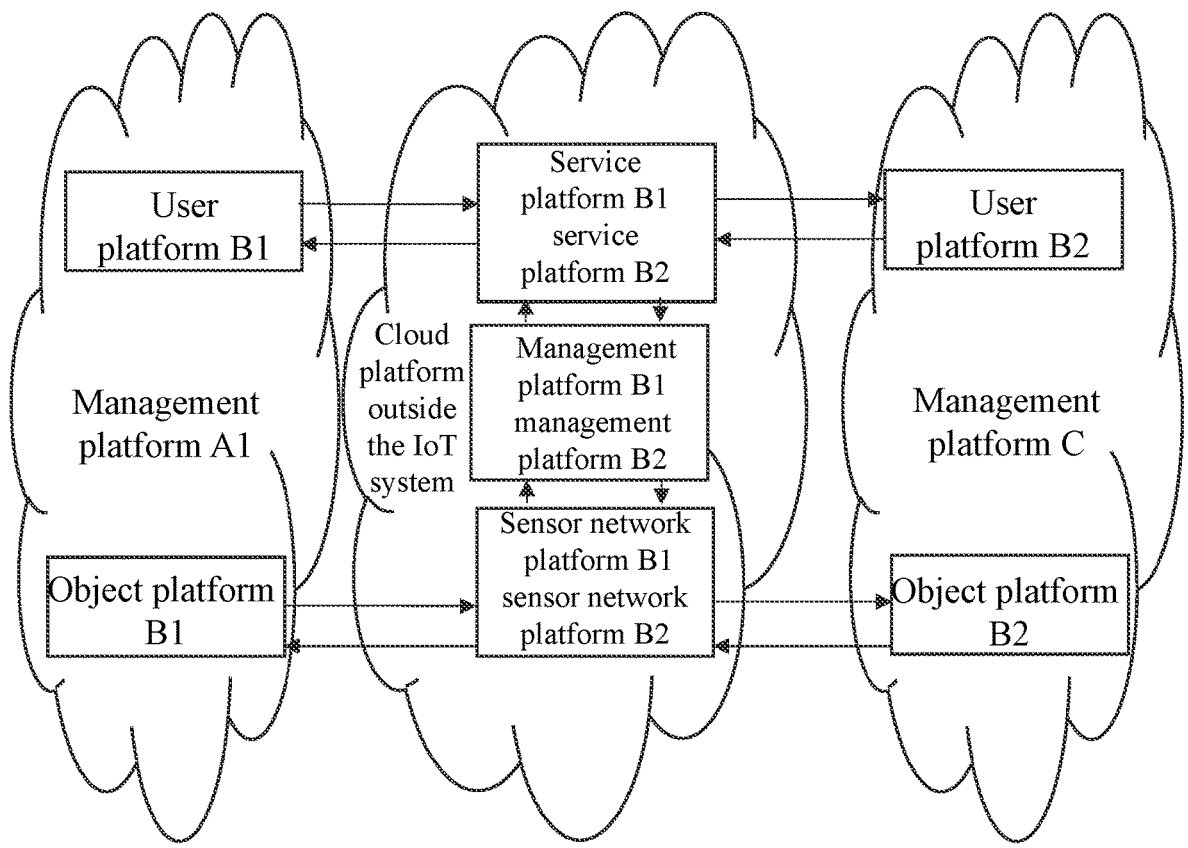
FIG. 13 is a schematic diagram illustrating a system architecture according to an embodiment of the present disclosure.

In one embodiment, referring to FIG. 13, establishing the user platform B and the object platform B on the management platform A, and establishing the service platform B, the management platform B, and the sensor network platform B on the cloud platform outside the IoT system; the user platform B, the service platform B, the management platform B, the sensor network platform B and the object platform B interact in sequence.

FIG. 13 also shows a more specific implementation, the management platform A1 and the management platform C are both cloud platforms inside the IoT system that interact with the cloud platform outside the IoT system, the management platform A1 interacts with the cloud platform outside the IoT system through the way of the object platform B1→the sensor network platform B1→ The management platform B1→service platform B1→user platform B1, and similarly, the management platform C interacts with the cloud platform outside the IoT system through the way of the object platform B2→sensor network platform B2→management platform B2→service platform B2→user platform B2; the management platform C and the management platform A1 share the same sensor network platform, the management platform and the service platform to achieve interaction, which is also conducive to data sharing.

Further, the management platform B obtains compression parameters that match the different gases in gas classification data and the first environment data as the first compression parameter, and obtains compression parameters that match the different gases in gas classification data and the second environment data as the second compression parameter.

The management platform B inputs the first environmental data, the second environmental data, the gas classification data, the first compression parameter and the second compression parameter into a component correction model preset in the management platform B to generate second component data.

Further, the gas classification data includes methane data, ethane data, polyalkane data, other flammable data, and non-flammable data; the compression parameters include the compression factor and a second virial coefficient.

When the management platform B inputs the first environment data, the second environment data, the gas classification data, the first compression parameter and the second compression parameter into the component correction model, the management platform B performs the actual gas equation of state operation on each type of classified data through the component correction model to obtain actual volume fraction data of each type of classified data corresponding to the second compression parameter.

The management platform B combines actual volume fraction data corresponding to each classification data through the second virial coefficient to form second component data through the component correction model.

The specific embodiments described above further describe the objectives, technical solutions and beneficial effects of the present disclosure in detail, and it should be understood that the above descriptions are only specific embodiments of the present disclosure, and are not intended to limit the scope of the present disclosure, any modification, equivalent replacement, improvement, etc. made within the spirit and principle of the present disclosure shall be included within the protection scope of the present disclosure.

The basic concepts have been described above, obviously, for those skilled in the art, the above detailed disclosure is merely a way of example, and does not constitute a limitation of the present disclosure. Although not explicitly described herein, various modifications, improvements, and corrections to the present disclosure may occur to those skilled in the art. Such modifications, improvements, and corrections are suggested in the present disclosure, so such modifications, improvements, and corrections still belong to the spirit and scope of the exemplary embodiments of the present disclosure.

Meanwhile, the present disclosure uses specific words to describe the embodiments of the present disclosure. Examples such as "one embodiment," "an embodiment," and/or "some embodiments" mean a certain feature, structure, or characteristic associated with at least one embodiment of the present disclosure. Therefore, it should be emphasized and noted that two or more references to "an embodiment" or "one embodiment" or "an alternative embodiment" in various places in the present disclosure are not necessarily referring to the same embodiment. Furthermore, certain features, structures or characteristics of the one or more embodiments of the present disclosure may be combined as appropriate.

Furthermore, unless explicitly stated in the claims, the order of processing elements and sequences, the use of alpha numerics, or the use of other names described in the present disclosure is not intended to limit the order of the processes and methods of the present disclosure. While the above disclosure discusses some presently believed useful embodiments of the disclosure by way of various examples, but it is to be understood that such details are for purposes of illustration only and that the appended claims are not limited to the disclosed embodiments, but on the contrary, the claims are intended to cover all modifications and equivalent combinations that come within the spirit and scope of the embodiments of the present disclosure. For example, although the implementation of various components described above may be embodied in a hardware device, it may also be implemented as a software only solution, such as an installation on an existing server or mobile device.

Similarly, it should be noted that to simplify the expressions disclosed in the present disclosure and thus help the understanding of one or more embodiments of the disclosure, in the foregoing description of the embodiments of the present disclosure, various features may sometimes be combined into one embodiment, drawings or descriptions thereof. However, this method of disclosure does not imply that the subject matter of the description requires more features than that are recited in the claims. Rather, claimed subject matter may lie in less than all features of a single foregoing disclosed embodiment.

Some embodiments use numbers to describe quantities of ingredients and attributes, it should be understood that such numbers used to describe the embodiments, in some examples, use the modifiers "about", "approximately" or "substantially" to retouch. Unless stated otherwise, "about", "approximately" or "substantially" means that a variation of ±20% is allowed for the stated number. Accordingly, in some embodiments, the numerical parameters set forth in the present disclosure and claims are approximations that may vary depending on the desired characteristics of individual embodiments. In some embodiments, numerical parameters should take into account specified significant digits and use a general digit reservation method. Notwithstanding that the numerical fields and parameters used in some embodiments of the present disclosure to confirm the breadth of their ranges are approximations, in specific embodiments, such numerical values are set as precisely as practicable.

For each patent, patent application, patent application publication, and other material, such as article, book, disclosure, publication, document, etc., cited in the present disclosure, the entire contents of which are hereby incorporated into the present disclosure for reference. History application documents that are inconsistent or conflictive with the contents of the present disclosure are excluded, as well as documents (currently or subsequently appended to the present disclosure) limiting the broadest scope of the claims of the present disclosure. It should be noted that, if there is any inconsistency or conflict between the descriptions, definitions, and/or usage of terms in subsidiary information of the present disclosure and the contents of the present disclosure, the descriptions, definitions and/or usage of terms in the present disclosure shall prevail.

Finally, it should be understood that the embodiments described in the present disclosure are only used to illustrate the principles of the embodiments of the present disclosure. Other deformations are also possible within the scope of the present disclosure. Therefore, merely by way of example and not limitation, alternative configurations of the embodiments of the present disclosure may be considered consistent with the teachings of the present disclosure. Accordingly, the embodiments of the present disclosure are not limited to those embodiments expressly introduced and described in the present disclosure.

What is claimed is:

1. A method for obtaining a natural gas energy metering component, which is implemented by a management platform, comprising:
    obtaining a temperature and pressure of a natural gas sample to be detected at a first site based on an object platform;
    obtaining sample data of a natural gas sample at a second site based on the object platform, the sample data including a natural gas component of the natural gas sample at the second site and a temperature and pressure of the natural gas component;
    obtaining sample data of a natural gas sample at the first site based on the object platform, the sample data including a natural gas component of the natural gas sample at the first site and a temperature and pressure of the natural gas component; and
    determining a natural gas component of the natural gas sample to be detected at the first site through a prediction model based on the sample data at the first site and the second site aggregated by a sensor network platform and the temperature and pressure of the natural gas sample to be detected at the first site, wherein the prediction model is a machine learning model, including a plurality of transformation layers and a prediction layer;

an input of the plurality of transformation layers includes the natural gas component of the natural gas sample at the first site, the natural gas component of the natural gas sample at the second site, the temperature and pressure of the natural gas component at the first site, and the temperature and pressure of the natural gas component at the second site; and an output of the plurality of transformation layers includes a temperature, pressure, and composition data of the natural gas components at the first site and the second site after reduction;

an input of the prediction layer includes the temperature and pressure of the natural gas sample to be detected and the output of the plurality of transformation layers;

an output of the prediction layer includes component data of the natural gas sample to be detected during extraction, and training of the prediction model includes:

pre-training the transformation layers to obtain pre-trained transformation layers; and jointly training the pre-trained transformation layers and the prediction layer to obtain the prediction model.

2. The method of claim 1, wherein the obtaining a temperature and pressure of a natural gas sample to be detected at a first site based on an object platform comprises:

performing a reduction process on the natural gas sample to be detected, and obtaining a plurality of natural gas samples to be detected at a plurality of temperatures and pressures during the reduction based on the object platform.

3. The method of claim 1, wherein the determining the natural gas component of the natural gas sample to be detected at the first site through a prediction model based on the sample data at the first site and the second site aggregated by a sensor network platform and the temperature and pressure of the natural gas sample to be detected at the first site comprises:

determining, based on a correction coefficient, the sample data at the first site, the sample data at the second site, and the temperature and pressure of the natural gas sample to be detected at the first site, the natural gas component of the natural gas sample to be detected at the first site through the prediction model;

wherein the correction coefficient is determined based on a temperature and/or pressure of the natural gas sample to be detected before the reduction and a temperature and/or pressure during the extraction.

4. An Internet of Things (IoT) system for obtaining a natural gas energy metering component, comprising an object platform, a sensor network platform, a management platform, wherein the management platform is configured to:

obtain a temperature and pressure of a natural gas sample to be detected at a first site based on an object platform;

obtain sample data of a natural gas sample at a second site based on the object platform, the sample data including a natural gas component of the natural gas sample at the second site and a temperature and pressure of the natural gas component;

obtain sample data of a natural gas sample at the first site based on the object platform, the sample data including a natural gas component of the natural gas sample at the first site and a temperature and pressure of the natural gas component; and determine a natural gas component of the natural gas sample to be detected at the first site through a prediction model based on the sample data at the first site and the second site aggregated by a sensor network platform and the temperature and pressure of the natural gas sample to be detected at the first site, wherein the prediction model is a machine learning model, including a plurality of transformation layers and a prediction layer;

an input of the plurality of transformation layers includes the natural gas component of the natural gas sample at the first site, the natural gas component of the natural gas sample at the second site, the temperature and pressure of the natural gas component at the first site, and the temperature and pressure of the natural gas component at the second site; and an output of the plurality of transformation layers includes a temperature, pressure, and composition data of the natural gas components at the first site and the second site after reduction;

an input of the prediction layer includes the temperature and pressure of the natural gas sample to be detected and the output of the plurality of transformation layers;

an output of the prediction layer includes component data of the natural gas sample to be detected during extraction, and training of the prediction model includes:

pre-training the transformation layers to obtain pre-trained transformation layers; and jointly training the pre-trained transformation layers and the prediction layer to obtain the prediction model.

5. The IoT system of claim 4, wherein the object platform is further configured to:

obtain a plurality of natural gas samples to be detected at a plurality of temperatures and pressures in a process of reducing the natural gas sample to be detected.

6. The IoT system of claim 4, wherein the management platform is further configured to:

determine, based on a correction coefficient, the sample data at the first site, the sample data at the second site, and the temperature and pressure of the natural gas sample to be detected at the first site, the natural gas component of the natural gas sample to be detected at the first site through the prediction model;

wherein the correction coefficient is determined based on a temperature and/or pressure of the natural gas sample to be detected before the reduction and a temperature and/or pressure during the extraction.

7. A computer-readable storage medium storing computer instructions, wherein when reading the computer instructions in the storage medium, a computer implements the method for obtaining the natural gas energy metering component of claim 1.

* * * * *